(12) United States Patent
Jung et al.

(10) Patent No.: US 7,351,501 B2
(45) Date of Patent: Apr. 1, 2008

(54) ELECTROLYTE FOR RECHARGEABLE LITHIUM BATTERY AND RECHARGEABLE LITHIUM BATTERY COMPRISING SAME

(75) Inventors: Cheol-Soo Jung, Ohsan (KR); Takitaro Yamaguchi, Yokohama (JP); Ryuichi Shimizu, Yokohama (JP)

(73) Assignee: Samsung SDI Co., Ltd, Suwon-si (KR)

( * ) Notice: Subject to any disclaimer, the term of this patent is extended or adjusted under 35 U.S.C. 154(b) by 434 days.

(21) Appl. No.: 10/754,453

(22) Filed: Jan. 9, 2004

(65) Prior Publication Data

US 2004/0197668 A1   Oct. 7, 2004

(30) Foreign Application Priority Data

Jan. 9, 2003   (JP)   ............... 2003-003047
Oct. 23, 2003  (JP)   ............... 2003-363591
Dec. 26, 2003  (KR)  ............ 10-2003-0097895

(51) Int. Cl.
*H01M 10/40* (2006.01)
*H01M 2/16* (2006.01)
*H01M 6/14* (2006.01)

(52) U.S. Cl. .............. 429/302; 429/188; 429/306; 429/324; 429/330; 429/332; 429/137; 429/246; 429/200

(58) Field of Classification Search ........... 429/302, 429/188, 306, 324, 330, 332
See application file for complete search history.

(56) References Cited

U.S. PATENT DOCUMENTS 6,124,062 A * 9/2000 Horie et al. ............... 429/324

| | | | |
|---|---|---|---|
| 6,436,577 B1 | 8/2002 | Kida et al. | |
| 6,783,897 B2 * | 8/2004 | Kang et al. | 429/313 |
| 6,872,493 B2 * | 3/2005 | Yamada et al. | 429/313 |
| 2002/0160256 A1 * | 10/2002 | Kami et al. | 429/122 |

FOREIGN PATENT DOCUMENTS

| EP | 0581296 A2 * | 2/1994 |
|---|---|---|
| JP | 06-096759 * | 4/1994 |
| JP | 8-78053 | 3/1996 |
| JP | 08-078053 * | 3/1996 |
| JP | 11-213042 | 8/1999 |
| JP | 2000-58123 | 2/2000 |
| JP | 2003-142157 | 5/2003 |
| JP | 2003142157 * | 5/2003 |
| JP | 2003-197030 * | 7/2003 |
| JP | 2003-229019 | 8/2003 |
| JP | 2003229019 * | 8/2003 |

(Continued)

OTHER PUBLICATIONS

Patent Abstract of Japan, Publication No. 08-078053, Published on Mar. 22, 1996, in the name of Osawa, et al.

(Continued)

*Primary Examiner*—Patrick Joseph Ryan
*Assistant Examiner*—Angela J. Martin
(74) *Attorney, Agent, or Firm*—Christie, Parker & Hale, LLP

(57) ABSTRACT

Disclosed is a non-aqueous electrolyte for a rechargeable lithium battery including a polyether-modified silicon oil in which a polyether chain is bonded to a terminal end of a linear polysiloxane, a cyclic carbonate, and a lithium salt.

16 Claims, 25 Drawing Sheets

FOREIGN PATENT DOCUMENTS

KR    2000-0076049    12/2000

OTHER PUBLICATIONS

Patent Abstract of Japan, Publication No. 11-213042, Published on Aug. 6, 1999, in the name of Funoaka, et al.
Patent Abstract of Japan, Publication No. 2000-058123, Published on Feb. 25, 2000, in the name of Horie, et al.
Japanese Patent Laid-Open; Japanese Patent Laid-Open No. 2003-142157; Japanese Patent Laid-Open Date: May 16, 2003 for Japanese Patent Application No. 2002-23959 filed on Oct. 31, 2001 in the name of Horie.
Japanese Patent Laid-Open; Japanese Patent Laid-Open No. 2003-229019; Japanese Patent Laid-Open Date: Aug. 15, 2003 for Japanese Patent Application No. 2002-23959 filed on Dec. 17, 1980 in the name of Noda, et al.

* cited by examiner

Several minutes

ELECTROLYTE FOR RECHARGEABLE LITHIUM BATTERY AND RECHARGEABLE LITHIUM BATTERY COMPRISING SAME

CROSS REFERENCE TO RELATED APPLICATION

This application claims priority of Japanese application Nos. 2003-003047 and 2003-363591 filed in the Japan Patent Office on Jan. 9, 2003 and Oct. 23, 2003, and Korean application No. 2003-97895 filed in the Korean Intellectual Property Office Dec. 26, 2003, the entire disclosures of which are all incorporated hereinto by reference.

1. Field of the Invention

The present invention relates to an electrolyte for a rechargeable lithium battery and a rechargeable lithium battery comprising the same, and more particularly, to an electrolyte for a rechargeable lithium battery exhibiting good thermal safety and ionic conductivity and a rechargeable lithium battery comprising the same.

2. Background of the Invention

Conventionally, organic solvents in electrolytes use one or a mixture of cyclic esters such as ethylene carbonate, or propylene carbonate, linear esters such as dimethyl carbonate or propionate ester, or cyclic ethers such as tetrahydrofurane. However, the low boiling point of the linear esters and cyclic ethers cause problems associated with thermal safety. There have been recent attempts to improve the thermal stability for the use of a silicon oil solvent in electrolytes. One such silicon oil solvent is disclosed in Japanese Patent Laid-Open Nos. Hei 8-78053, Hei 11-213042 and 2000-58123. Such silicon oils, however, have insufficient ionic conductivity to use in electrolytes for rechargeable lithium batteries.

SUMMARY OF THE INVENTION

It is an aspect of the present invention to provide an electrolyte for a rechargeable lithium battery exhibiting good thermal stability and ionic conductivity.

It is another aspect to provide a rechargeable lithium battery including the electrolyte.

These and other aspects may be achieved by an electrolyte for a rechargeable lithium battery including a polyether-modified silicon oil represented by formulas 1 or 2 in which a polyether chain is bonded to a terminal end of a linear polysiloxane chain, a cyclic carbonate, and a lithium salt.

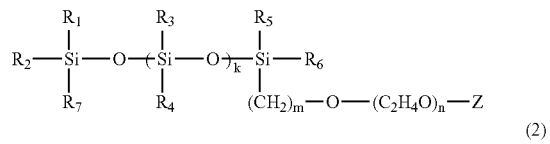

(1)

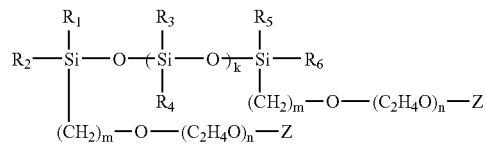

(2)

where k is an integer of 0 to 10; m is a natural number between 2 and 4; n is a natural number of 1 to 4;

$R_1$ to $R_7$ are independently or identically, selected from hydrogen or $C_1$ to $C_5$ alkyls, and more preferably $CH_3$ or $C_2H_5$; and Z is $CH_3$ or $C_2H_5$.

In order to achieve these aspects and others, the present invention provides a rechargeable lithium battery including the non-aqueous electrolyte, a positive electrode, and a negative electrode.

The electrolyte including the polyether-modified silicon oil represented by the formulas 1 or 2 can provide a rechargeable lithium battery exhibiting high-temperature safety, and which is able to charge and discharge at high rates.

The rechargeable lithium battery further includes a thin layer on the negative electrode. The thin layer includes one or more of a polyacrylate compound or an aziridine compound (e.g. rechargeable lithium batteries according to Experiments 7 to 9, Examples 3 and 4). The thin layer prevents decomposition of the non-aqueous electrolyte and improves the charge and the discharge capacities.

The non-aqueous electrolyte further includes a linear carbonate. The non-aqueous electrolyte further includes a fluorinated cyclic carbonate.

The polyacrylate compound is preferably a multifunctional acrylate. The term "multifunctional acrylate" indicates poly(ester)(meth)acrylate in which hydroxide groups in (polyester)polyol with at least three hydroxides (—OH) are partially or totally substituted with (meth)acrylic ester, and un-substituted hydroxide groups are substituted with groups having no radical reactivity.

The aziridine compound may be one represented by formulas 3 to 6. Preferably, the aziridine compound may be a compound represented by formula 3, or a mixture of a compound represented by formula 3 and a compound represented by formula 4 (e.g. rechargeable lithium batteries according to Experiments 7 to 9, and Examples 3 and 4).

Alternatively, the aziridine compound may be one represented by formulas 5 and 6. In this case, it is preferably used together with the compound represented by formula 3 and/or the compound represented by formula 4.

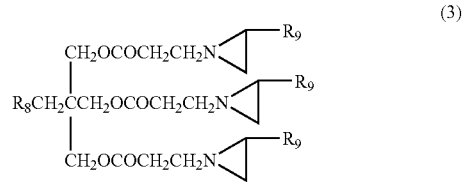

(3)

where $R_8$ is H, $CH_3$ or OH, and $R_9$ is H or $CH_3$.

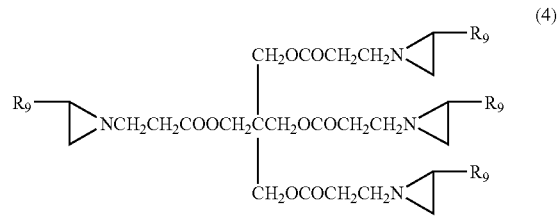

(4)

where $R_9$ is H or $CH_3$.

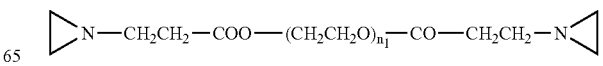

(5)

where $n_1$ is an integer from 0 to 10.

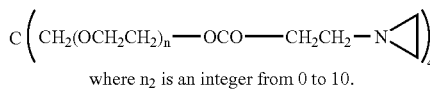

(6)

where n₂ is an integer from 0 to 10.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1A:
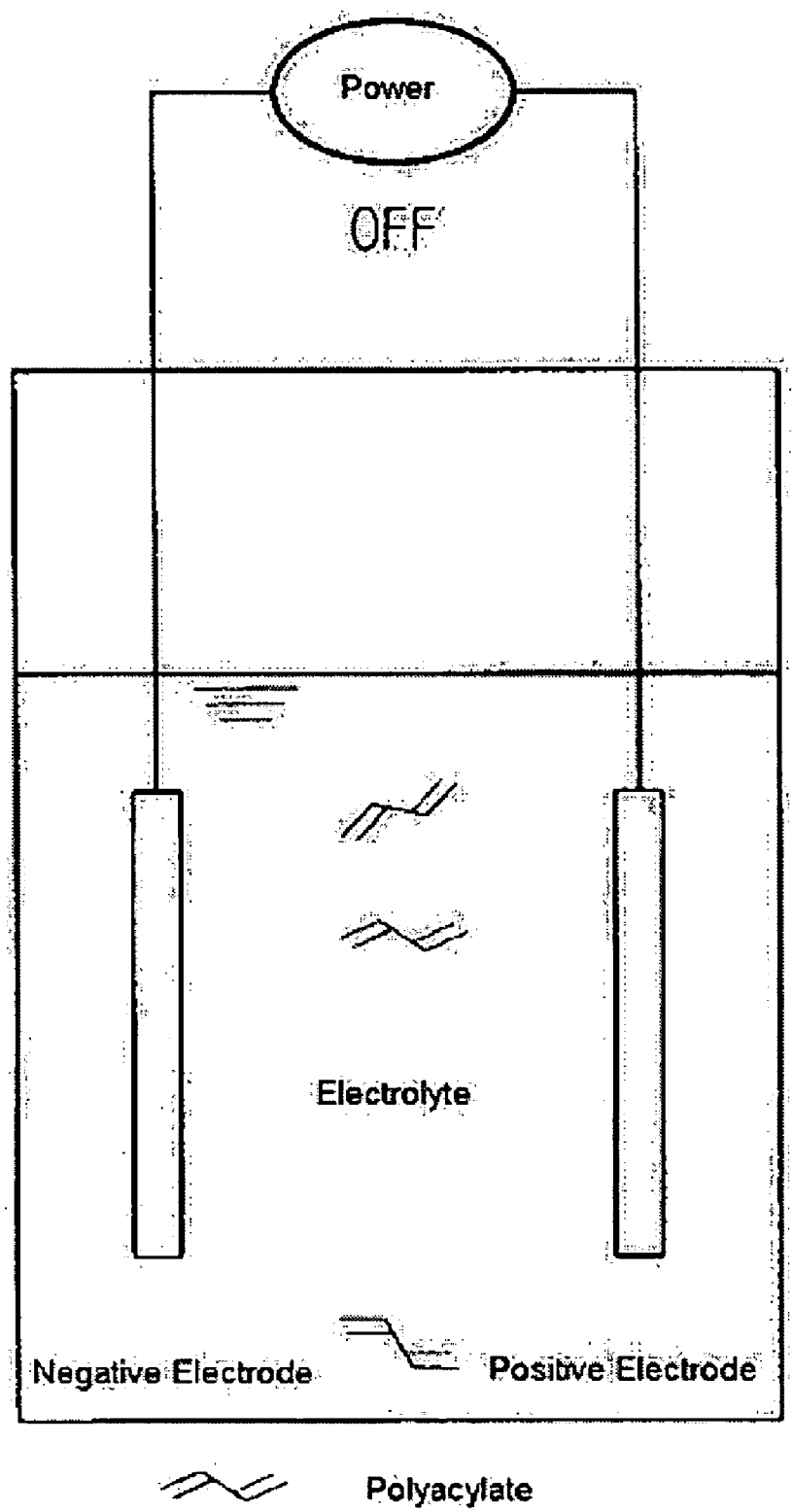
FIGS. 1(a) to 1(c) are drawings illustrating a mechanism for forming a polyacrylate compound thin layer on a surface of a negative electrode.

An electrolyte of the present invention includes a polyether-modified silicon oil represented by formula 1 (e.g. oil 1 in Example) or formula 2 (e.g. oil 2 in Example), a cyclic carbonate, and a lithium salt (e.g. electrolytes according to Experiments 1 to 4, 7 to 9, and Examples 1 to 4).

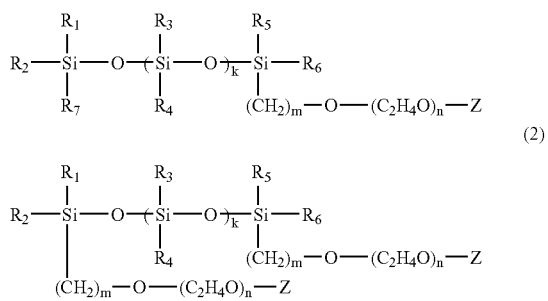

where k is an integer of 0 to 10; m is a natural number between 2 and 4; n is a natural number between 1 and 4; $R_1$ to $R_7$ are independently or identically selected from hydrogen or a $C_1$ to $C_5$, and preferably $CH_3$ or $C_2H_5$; and Z is $CH_3$ or $C_2H_5$.

The polyether-modified silicon oil represented by formulas 1 or 2 provides a non-aqueous electrolyte exhibiting good thermal stability and ionic conductivity. The polyether-modified silicon oil preferably has a viscosity of less than 10 cSt at 25° C. (e.g. in Examples, oils 1 and 2). A viscosity of less than 10 cSt helps to actively move lithium ions, thereby preventing fading of the lithium ionic conductivity.

The polyether-modified silicon oil preferably has a flash point of 120° C. or more (e.g. in Examples, oils 5, 6, and 7), and more preferably 160° C. or more (e.g. in Examples, oils 1 and 2) which results in little flashing at high temperatures and the improvement of thermal stability.

The non-aqueous electrolyte of the present invention further includes a linear carbonate (e.g. electrolytes according to Examples 1 to 4).

The non-aqueous electrolyte of the present invention further includes a fluorinated cyclic carbonate (e.g. electrolytes according to Examples 10 to 11).

A rechargeable lithium battery of the present invention includes the non-aqueous electrolyte, a positive electrode and a negative electrode.

The electrolyte including the polyether-modified silicon oil represented by the formulas 1 or 2 can provides a rechargeable lithium battery exhibiting high-temperature safety, and which is able to charge and discharge at high rates.

In the rechargeable lithium battery, the electrolyte further includes a linear carbonate (e.g. electrolytes according to Examples 1 to 4).

In the rechargeable lithium battery, the electrolyte further includes a fluorinated cyclic carbonate (e.g. electrolytes according to Examples 10 and 11).

The rechargeable lithium battery further includes a thin layer on the negative electrode. The thin layer includes one or more of a polyacrylate compound, an aziridine compound, or a fluorinated cyclic carbonate (e.g. rechargeable lithium batteries according to Experiments 7 to 9, Examples 3 and 4). The thin layer prevents the decomposition the non-aqueous electrolyte and improves the charge and the discharge capacities.

The polyacrylate compound is preferably a multifunctional acrylate. The term "multifunctional acrylate" indicates a poly(ester)(meth)acrylate in which hydroxide groups in (polyester)polyol with at least three hydroxides (—OH) are partially or totally substituted with (meth)acrylic ester, and un-substituted hydroxide groups are substituted with groups having no radical reactivity.

The aziridine compound may be one represented by formulas 3 to 6. Preferably, the aziridine compound may be a compound represented by formula 4, or a mixture of a compound represented by formula 3 and a compound represented by formula 4 (e.g. rechargeable lithium batteries according to Experiments 7 to 9, and Examples 3 and 4).

Alternatively, the aziridine compound may be one represented by formulas 5 to 6. In this case, it is preferable to use it together with the compound represented by formula 3 and/or the compound represented by formula 4.

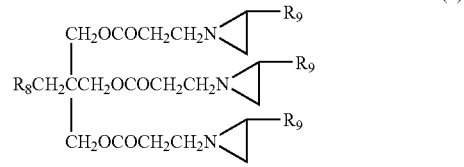

where $R_8$ is H, $CH_3$ or OH, and $R_9$ is H or $CH_3$.

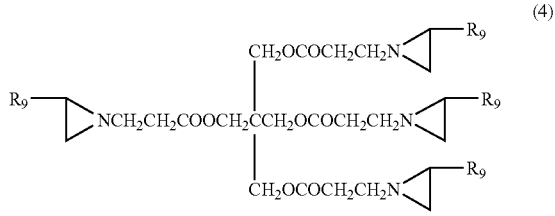

where $R_9$ is H or $CH_3$.

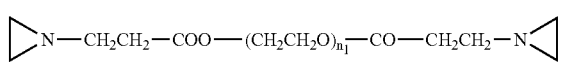

where $n_1$ is an integer from 0 to 10.

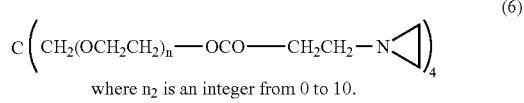

where $n_2$ is an integer from 0 to 10.

where $n_2$ is an integer from 0 to 10.

The present invention will be illustrated in more detail hereinafter.

The rechargeable lithium battery of the present invention includes a positive electrode, a negative electrode, and the inventive non-aqueous electrolyte. The non-aqueous electrolyte includes a polyether-modified silicon oil represented by formulas 1 to 2 in which a polyether chain is bonded to a terminal end of a linear polysiloxane chain. The non-aqueous electrolyte includes a cyclic carbonate and a lithium salt. In the formulas 1 and 2, k is an integer from 0 to 10, m is a natural number from 2 to 4, n is a natural number from 1 to 4, $R_1$ to $R_7$ are independently or identically hydrogen or a $C_1$ to $C_5$ alkyl, and preferably $CH_3$ or $C_2H_5$, and Z is $CH_3$ or $C_2H_5$.

The non-aqueous electrolyte is one in which a lithium salt as a solute is dissolved in a mixed solvent of the polyether-modified silicon oil and the cyclic carbonate. The electrolyte may further include a linear carbonate.

The non-aqueous electrolyte may be used to prepare a polymer gel electrolyte in which the electrolyte is immersed in a polymer matrix. The polymer may be selected from a polymer of polyethylene oxide (PEO), polypropylene oxide (PPO), polyacrylonitrile (PAN), polyvinylidene fluoride (PVDF), polymethacrylate, polymethyl methacrylate, and mixtures thereof.

The polyether-modified silicon oil includes one in which two polyether chains ($—(CH_2)_m—O—(C_2H_4O)_n—Z$) are bonded to both terminal ends of a linear polysiloxane chain ($SiR_2—O—(SiR_2O—)_k—SiR_2$) represented by formula 1, or one in which one polyether chain ($—(CH_2)_m—O—(C_2H_4O)_n—Z$) is bonded to one terminal end of a linear polysiloxane chain ($SiR_3—(SiR_2O—)_k—SiR_2$) represented by formula 2. The polyester-modified silicon oil has a polysiloxane chain, improving thermal stability and the solvation of oxygen in the ether bond and occurrence of lithium ions, rendering high ionic conductivity.

Since the polyether chain is bonded to one or both terminal ends of the linear polysiloxane chain, the polyether-modified silicon oil has a totally linear structure which results in an improvement in the flexibility of the polyether chain and its viscosity. Accordingly, ionic conductivity of the non-aqueous electrolyte improves. Furthermore, since the polyether chain is bonded to one or both terminal ends of the linear polysiloxane chain, the viscosity of the polyether-modified silicon oil decreases and ionic conductivity increases.

The polyether-modified silicone oil increases the flash point of a non-aqueous electrolyte, improving thermal stability and increasing ionic conductivity. In addition, the non-aqueous electrolyte with the polyether-modified siloxane can provide a rechargeable lithium battery exhibiting good high-temperature stability and being capable of charging and discharging at high rates.

The polyether-modified silicon oil preferably has a viscosity of less than 10 cSt at 25° C. A viscosity of less than 10 cSt helps to actively move lithium ion, thereby preventing fading of the lithium ionic conductivity.

The polyether-modified silicon oil preferably has a flash point of 120° C. or more, which results in little flashing at high temperatures and the improvement of thermal stability. More preferred is a flash point of 160° C. or more.

In formulas 1 and 2, k is an integer from 0 to 10, m is a natural number from 2 to 4, n is a natural number from 1 to 4, $R_1$ to $R_7$ are independently or identically hydrogen or a $C_1$ to $C_5$ alkyl and preferably $CH_3$ or $C_2H_5$, and Z is $CH_3$ or $C_2H_5$. If the value of k exceeds 10, the thermal stability relatively improves, but a shortcoming associated with an increase in the viscosity occurs. Furthermore, a value of k larger than 10 decreases the ability to solvate lithium ions, thereby decreasing ionic conductivity.

If the value of m is less than 2, it is difficult to synthesize the polyether-modified silicon oil, and if the value of m is grater than 4 the viscosity increases, thereby decreasing ionic conductivity.

If the value of n is less than 2 (that is, n is 0), the polyether chain does not substantially bond to the polysiloxane chain and the compatibility with the cyclic carbonate decreases. If the value of n is more than 4, the polyether chain is longer, which results in an increase in the viscosity and a decrease in the ionic conductivity.

If $R_1$ to $R_7$ are independently hydrogen or a $C_1$ to $C_5$ alkyl, and preferably $CH_3$ or $C_2H_5$, and Z is $CH_3$ or $C_2H_5$, it is easy to synthesize the polyether-modified silicon oil.

The cyclic carbonate includes at least one selected from ethylene carbonate, butylene carbonate, propylene carbonate, or y-butyrolactone. The cyclic carbonate is easily solvated with lithium ions, thereby increasing ionic conductivity of the non-aqueous electrolyte.

The linear carbonate preferably includes at least dimethyl carbonate, methylethyl carbonate, or diethyl carbonate. The low viscosity of the linear carbonate decreases the viscosity of the electrolyte, thereby increasing ionic conductivity. However, it is undesirable to use too large an amount of the linear carbonate because the low flash point of the linear carbonate decreases the flash point of the electrolyte.

The fluorinated cyclic carbonate may include ethylene fluorocarbonate, and preferably includes monofluoroethylene carbonate. The fluorinated cyclic carbonate lowers the flammability of the electrolyte so that the safety of the electrolyte can be improved. In addition, the fluorinated cyclic carbonate produces a thin layer on a surface of the negative electrode, which prevents the decomposition of the electrolyte, thereby improving the cycle life characteristics of the rechargeable lithium battery, and reducing gases produced by decomposing the electrolyte.

The lithium salt may be $LiPF_6$, $LiBF_4$, Beti salt ($Li[N(SO_2C_2F_6)_2]$), $Li[B(OCOCF_3)_4]$, $LiB(OCOC_2F5)_4]$ or mixtures thereof. Preferred are $LiPF_6$, Beti salt, or a mixture thereof. In the present invention, because the decomposition of $LiPF_6$ and the breakage of the Si—O bond in the polyether-modified silicon-oil may occur, Beti salt is more preferred. The concentration of the lithium salt is preferably 0.5 to 2.0 M/L. The lithium salt decreases ionic conductivity of the electrolyte.

The amount of the polyether-modified silicon oil is preferably 5 to 70 volume %, and more preferably 10 to 50 volume %. If the amount is less than 5 volume % of the polyether-modified silicon oil, the increased flash point of the electrolyte can not be obtained. An amount of more than 70 volume % increases viscosity, thereby decreasing ionic conductivity.

The amount of the cyclic carbonate is preferably 30 to 95 volume %, and more preferably 50 to 90 volume %. An amount of less than 30 volume % decreases ionic conductivity of the electrolyte, and an amount of more than 95 volume % increases viscosity of the electrolyte, thereby decreasing ionic conductivity.

If the electrolyte further includes the linear carbonate, the amount thereof is preferably 5 to 70 volume %, and more preferably 10 to 65 volume %. If the amount of the linear carbonate is less than 5 volume %, the effect caused by the addition of the linear carbonate cannot be achieved. If the amount of the linear carbonate is more than 70 volume %, the amounts of the cyclic carbonate and the polyether-modified silicon oil relatively decrease, thereby decreasing the flash point.

The polyether-modified silicon oil is prepared by reacting polysiloxane in which R groups are partially substituted with e.g. hydrogen, or with a polyether compound with a double bond, e.g. ($CH_2$—CH—).

The polyether-modified silicone oil represented by formula 1 is prepared, for example, by hydration-reacting $SiHR_2O(SiR_2O)_kSiHR_2$ (polysiloxane) with $CH_2$=CH$(CH_2)_{m-2}O(C_2H_5O)_nZ$ (polyether-substituted polyolefin) in the presence of platinum chloride.

The polyether-modified silicone oil represented by formula 2 is prepared, for example, by hydration-reacting $SiR_3O(SiR_2O)_kSiHR_2$ (polysiloxane) with $CH_2$=CH$(CH_2)_{m-2}O(C_2H_5O)_nZ$ (polyether-substituted polyolefin) in the presence of platinum chloride.

The obtained polyether-modified silicon oil includes Pt as a catalyst and BHT (dibutyl hydroxytoluene) as an agent for prohibiting polymerization at an amount of several to several tens of ppm. Such Pt and BHT may adversely affect the cycle life characteristics, so if possible, they are suitably removed. The removal process may be any techniques such as vacuum-distillation. The vacuum-distillation process is suitably performed at once, but preferably twice or more. The removal process such as vacuum-distillation can reduce the amount of Pt and BHT to less than a detectable level.

The polyether-modified silicone oil includes approximately 5 ppm of Pt and approximately 60 ppm of BHT. In the present invention, according to the performance of the removal process such as vacuum-distillation, the polyether-modified silicone oil preferably includes Pt at less than 5 ppm, and BHT at less than 60 ppm, and more preferably at an amount of less than the detectable boundary.

The positive electrode includes, for example, those formed by mixing a positive active material and a binder such as polyvinylidene fluoride, and a conducive agent such as carbon black, and shaping it into a sheet or a circle form, or shaping the positive active material into a sheet or a circle form and applying the sheet or the circle form on a current collector. Examples of the positive active material includes at least one lithiated intercalation compound including lithium, and at least one metal selected from the group consisting of cobalt, manganese, and nickel. Specifically, it is preferably $LiMn_2O_4$, $LiCoO_2$, $LiNiO_2$, $LiFeO_2$, or $V_2O_5$. It further includes a compound such as TiS, MoS, an organic disulfide compound, or an organic polysulfide compound, which is capable of reversible intercalation and deintercalation of lithium ions.

The rechargeable lithium battery includes a separator such as a porous polypropylene film or porous polyethylene film.

The negative electrode includes, for example, those formed by mixing a negative active material, a binder such as polyvinylidene fluoride, and optionally a conductive agent such as carbon black, and shaping it into a sheet or a circle form. The negative active material may be carbonaceous materials such as artificial graphite, natural graphite, graphitized carbon fiber, graphitized mesocarbon microbeads, or amorphous carbon, and a metal capable of alloying with lithium, and any mixture including the metal and carbonaceous material. Metals capable of alloying with lithium include Al, Si, SN, Pb, Zn, Bi, In, Mg, Ga, or Cd. Further, a lithium metal foil may also be used as a negative electrode.

The negative electrode preferably includes a thin layer including at least one polyacrylate compound, or an aziridine ring-included aziridine compound. The thin layer prevents the decomposition of the polyether-modified silicon oil, thereby increasing discharge capacity.

Preferred is a multifunctional acrylate. The term "multifunctional acrylate" indicates poly(ester)(meth)acrylate in which hydroxide groups are substituted with (meth)acrylic ester, and unsubstituted hydroxide groups are substituted with groups having no radical reactivity.

The aziridine compound may be represented by formulas 3 to 6. Alternatively, the aziridine compound may be a compound represented by formula 4, or a mixture of the compound represented by formula 3 and a compound represented by formula 4.

Alternatively, the aziridine compound may be one represented by formulas 5 and 6. In this case, it is preferably used together with the compound represented by formula 3 and/or the compound represented by formula 4.

In formula 3, $R_1$ is H, $CH_3$, or OH, and $R_2$ is H or $CH_3$. In formula 4, $R_2$ is H or $CH_3$, and in formula 5, n1 is preferably a natural number of 1 to 10. In formula 6, n1 is preferably 0 to 10.

The polyacrylate and the aziridine compound are polymerized to form a thin layer on a surface of the negative electrode during the initial charge and discharge of the rechargeable lithium battery. The thin layer has good lithium ionic conductivity and lower solubility to electrolyte than the polyether-modified silicon oil, so it maintains its stable structure.

The polyacrylate compound is an anion-addition polymerization monomer which is capable of anionic polymerizing and forms a thin layer on a surface of the negative electrode which has low potential during the charge. When the polyacrylate compound is anionic-polymerized, the double bonds in the molecule are broken and they react with the other polyacrylate compound, continuously, thereby forming a thin layer polymerized with the acrylate compound.

Figure 1B:
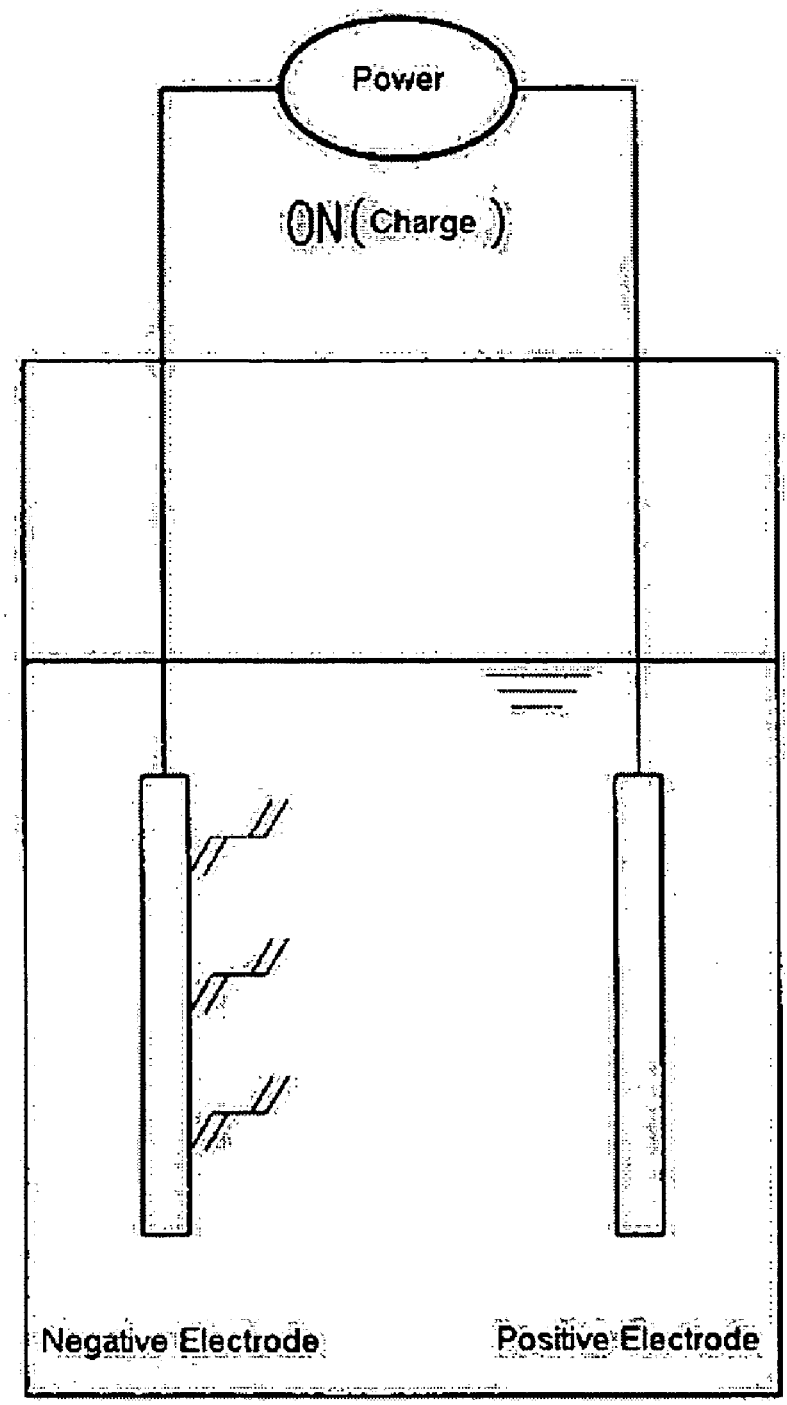
Figure 1C:
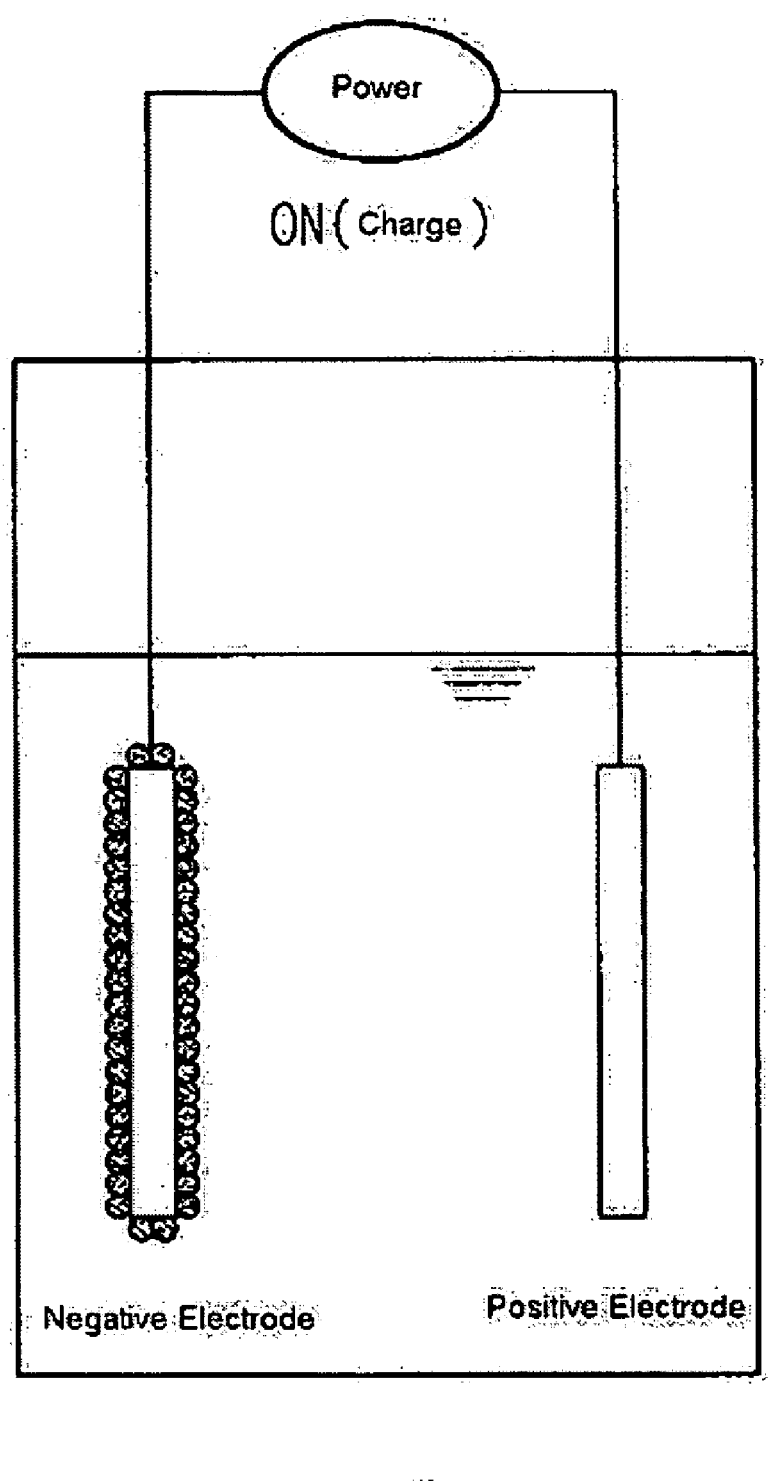

The mechanism for forming the thin layer derived from the polyacrylate compound is believed to be as shown in FIGS. 1(a)-1(c). As shown in FIG. 1(a), prior to the initial charge, the polyacrylate compound is present in the non-aqueous electrolyte, and when the charge starts, the polyacrylate compound is induced into a surface of the negative electrode as shown in FIG. 1(b) followed by the anion-polymerization on the surface to form the thin layer as shown in FIG. 1(c).

The aziridine compound represented by formulas 3 to 6 includes an aziridine ring with a backbone that includes two carbons and one nitrogen. The aziridine ring either coordinates with lithium or opens, and then polymerization with the other aziridine compound takes place to generate a polymer, thereby forming a thin layer.

Figure 2A:
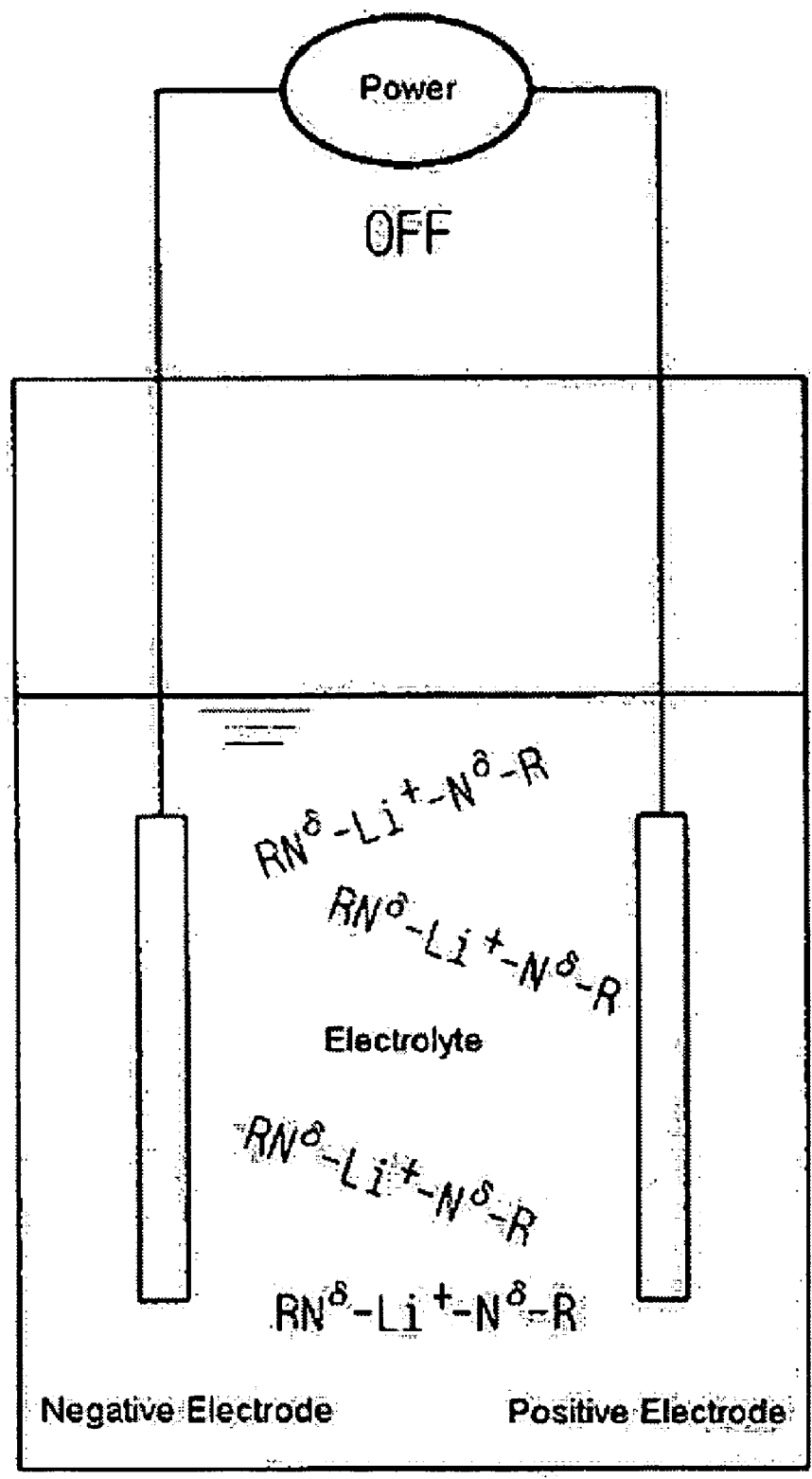
FIGS. 2(a) to 2(c) are drawings illustrating a mechanism for forming an aziridine compound thin layer on a surface of a negative electrode.
Figure 2B:
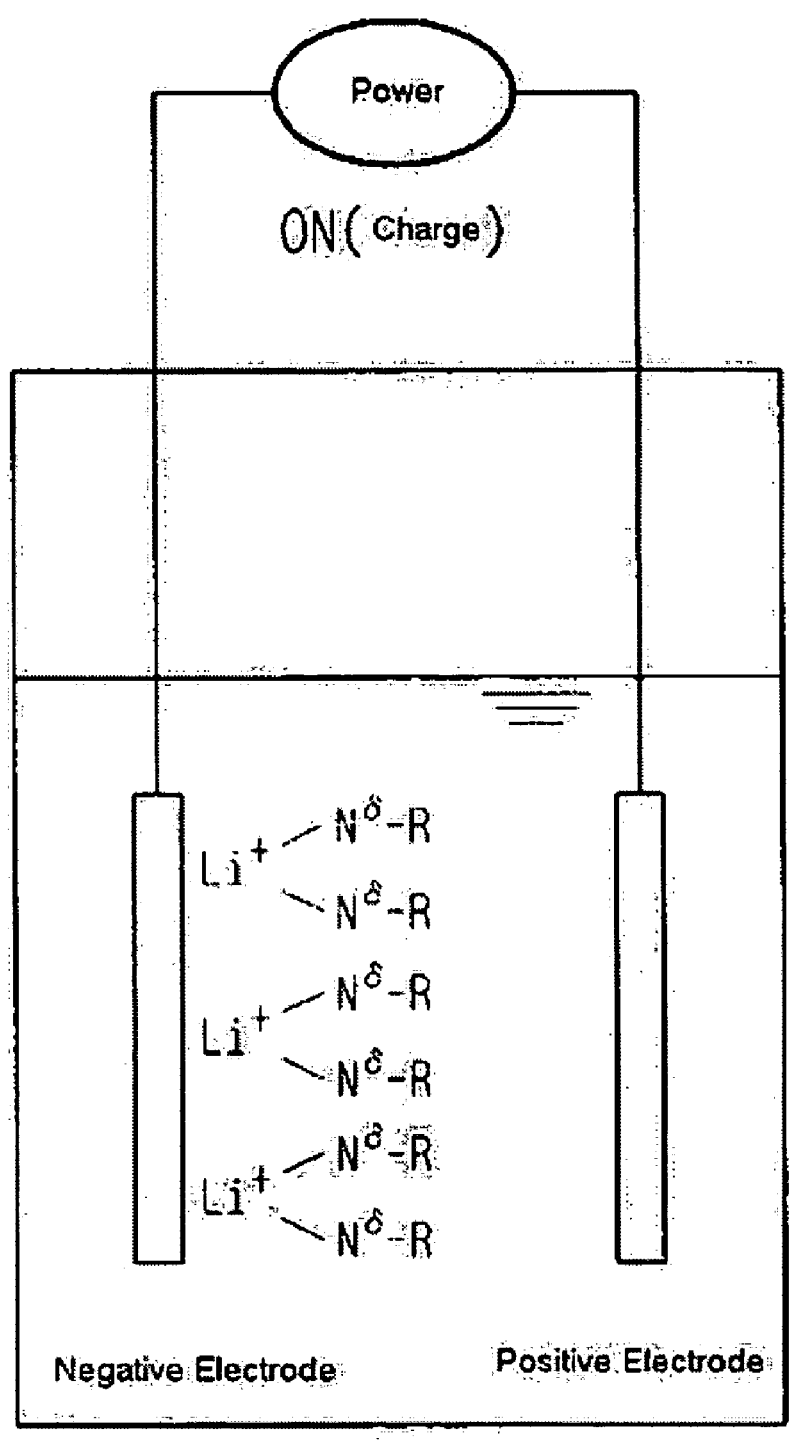
Figure 2C:
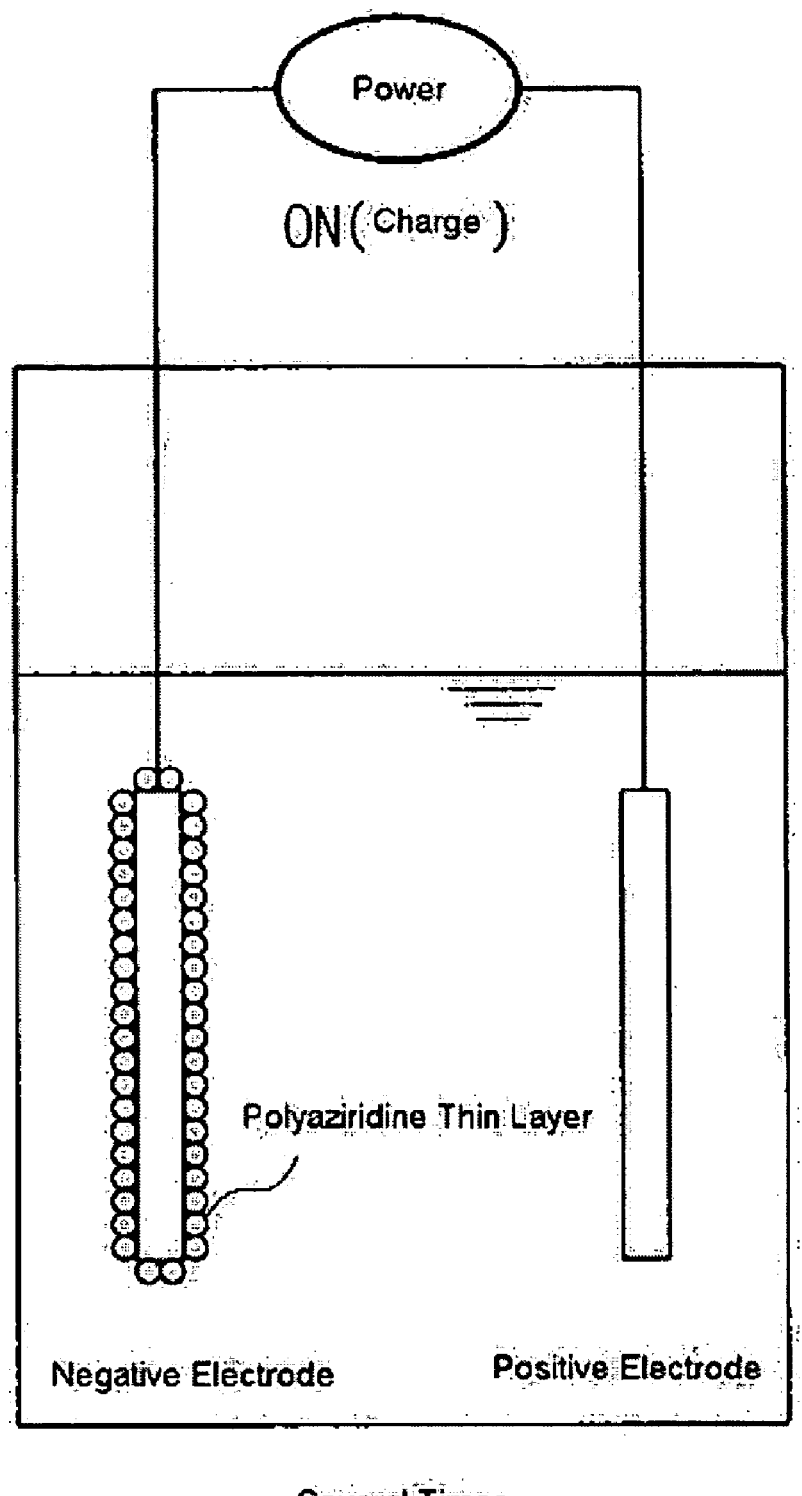

The mechanism for forming the thin layer is believed to be as shown in FIGS. 2(a)-2(c). Prior to starting the initial charge, lithium ions and a partial or total aziridine compound are present in the form of an ionic coordinate which is not of a high dimensional network (referred to as a "Li-aziridine coordinate"). It is considered that the Li-aziridine coordinate is prepared by coordinating a lithium cation with an aziridine ring with an anion. Thereafter, when the charge starts, the lithium cation transfers into a negative electrode to adhere the Li-aziridine coordinate on the surface of the negative electrode. This increases the density of the aziridine compound on the surface of the negative electrode.

Thereafter, the lithium ions are released and are free from the aziridine ring and coordinate to intercalate into the negative electrode. The aziridine ring is opened to facilitate the polymerization and to form a thin layer as shown in FIG. 2(c). The anionic electric charge of the thin layer allows transfer of only the cation. Thus, the thin layer can prevent the decomposition of the electrolyte caused by the direct contact between the electrolyte and the negative electrode.

The thin layer in which the polyacrylate compound and the aziridine are mixed has very low solubility to the polyether-modified silicon oil, so that the thin layer can be stably maintained.

Figure 3A:
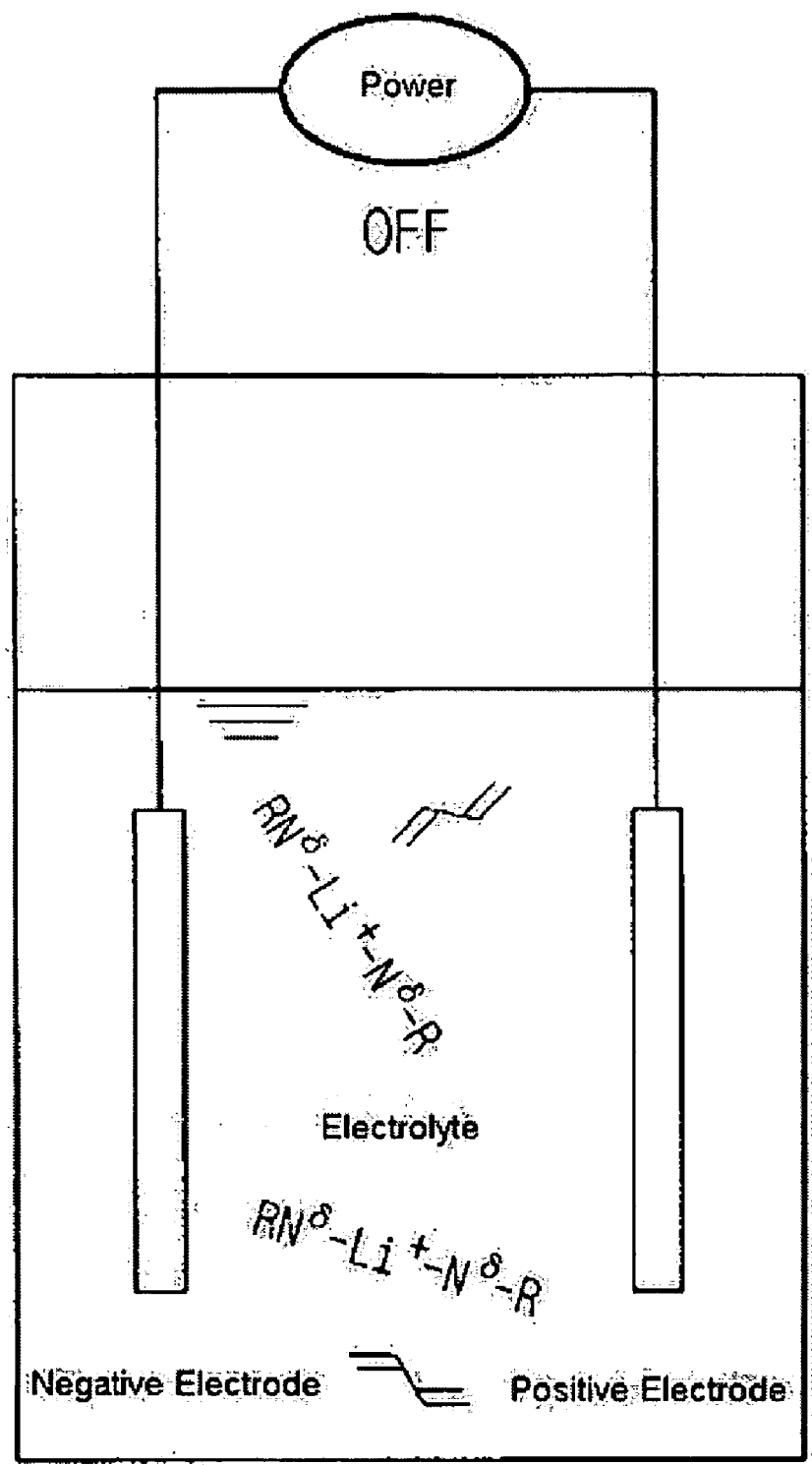
FIGS. 3(a) to 3(c) are drawings illustrating a mechanism for forming a polyacrylate compound and an aziridine compound thin layer on a surface of a negative electrode.
Figure 3B:
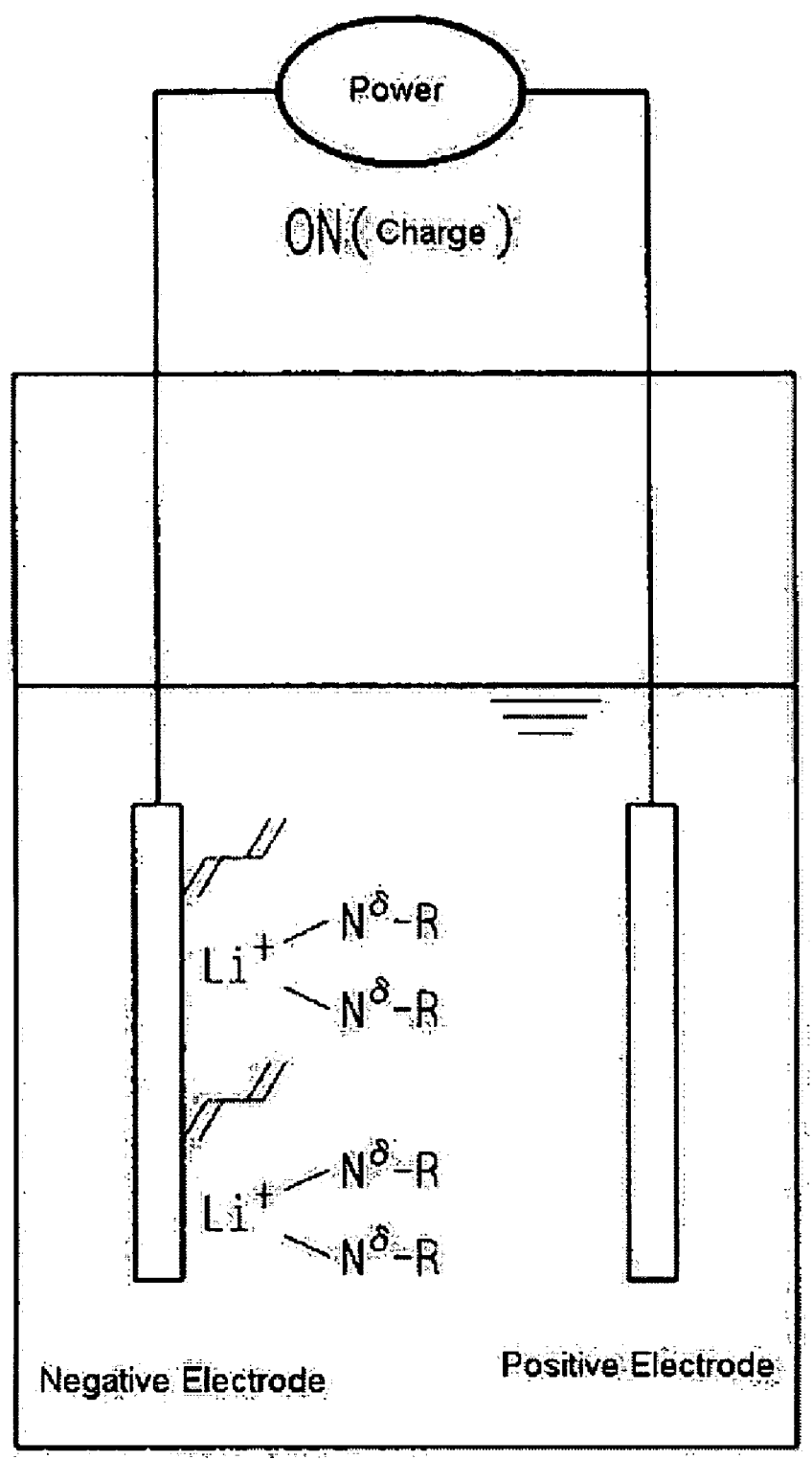
Figure 3C:
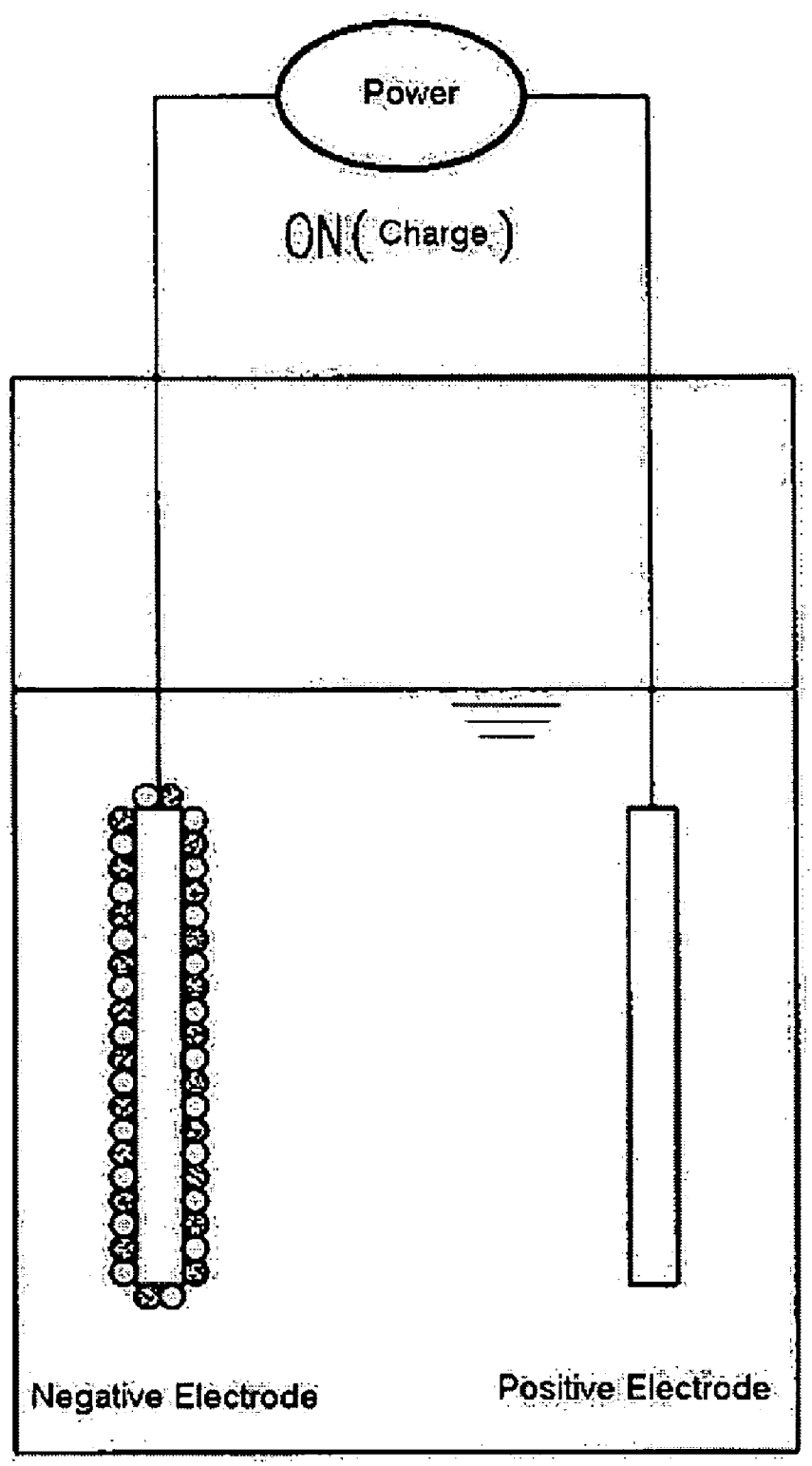

As shown in FIGS. 3(a)-3(c), when the polyacrylate compound and the aziridine compound are used together, the polymerization derived from the polyacrylate compound in FIGS. 1(a)-(c) and the polymerization derived from the aziridine compound in FIGS. 2(a)-2(c) respectively occur (FIGS. 3(a) and (b)) to finally form the thin layer including the mixed polyacrylate compound and the aziridine compound (FIG. 3(c)). The thin layer is very compact and hard, and has good resistance to the polyether-modified silicon oil.

The polyacrylate compound is preferably present in the amount of 0.1 to 1.0 wt % based on the electrolyte. The aziridine compound is preferably present in the amount of 0.5 to 1.5 wt % based on the electrolyte.

If the amounts of the polyacrylate compound and the aziridine compound are less than the above ranges, the thin layer is insufficiently formed to cover the surface of the negative electrode. If the amounts thereof are more than the above ranges, the thin layer is too thick which results in an increase in interfacial resistance.

The non-aqueous electrolyte with the polyether-modified silicon oil exhibits good thermal stability and can provide rechargeable lithium batteries having improved high-temperature characteristics and heat-resistance. In addition, the electrolyte with the polyether-modified silicon oil has reduced ionic conductivity, thereby improving the high-rate charge characteristics.

Furthermore, the thin layer including the polyacrylate compound and the aziridine compound prevents the decomposition of the polyether-modified silicon oil, thereby improving high-rate charge and discharge characteristics.

In the present invention, the thin layer is formed on the negative electrode during initial charge (formation).

A suitable amount of the polyacrylate compound and the aziridine compound in the electrolyte can be controlled according to the type of rechargeable lithium battery, because a large amount thereof absorbs the solvents and the lithium salt and the resulting material converts into a gel, that is, a polymer electrolyte. If the electrolyte is used in rechargeable lithium ion batteries, the polyacrylate compound and the aziridine compound should be used in a relatively small amount which does not cause gelation during the discharge, and does cause formation of the thin layer.

If the electrolyte is used in rechargeable lithium polymer batteries, the polyacrylate compound and the aziridine compound should be used in a relatively large amount which does cause gelation during the discharge, and does cause formation of the thin layer.

Figure 19:
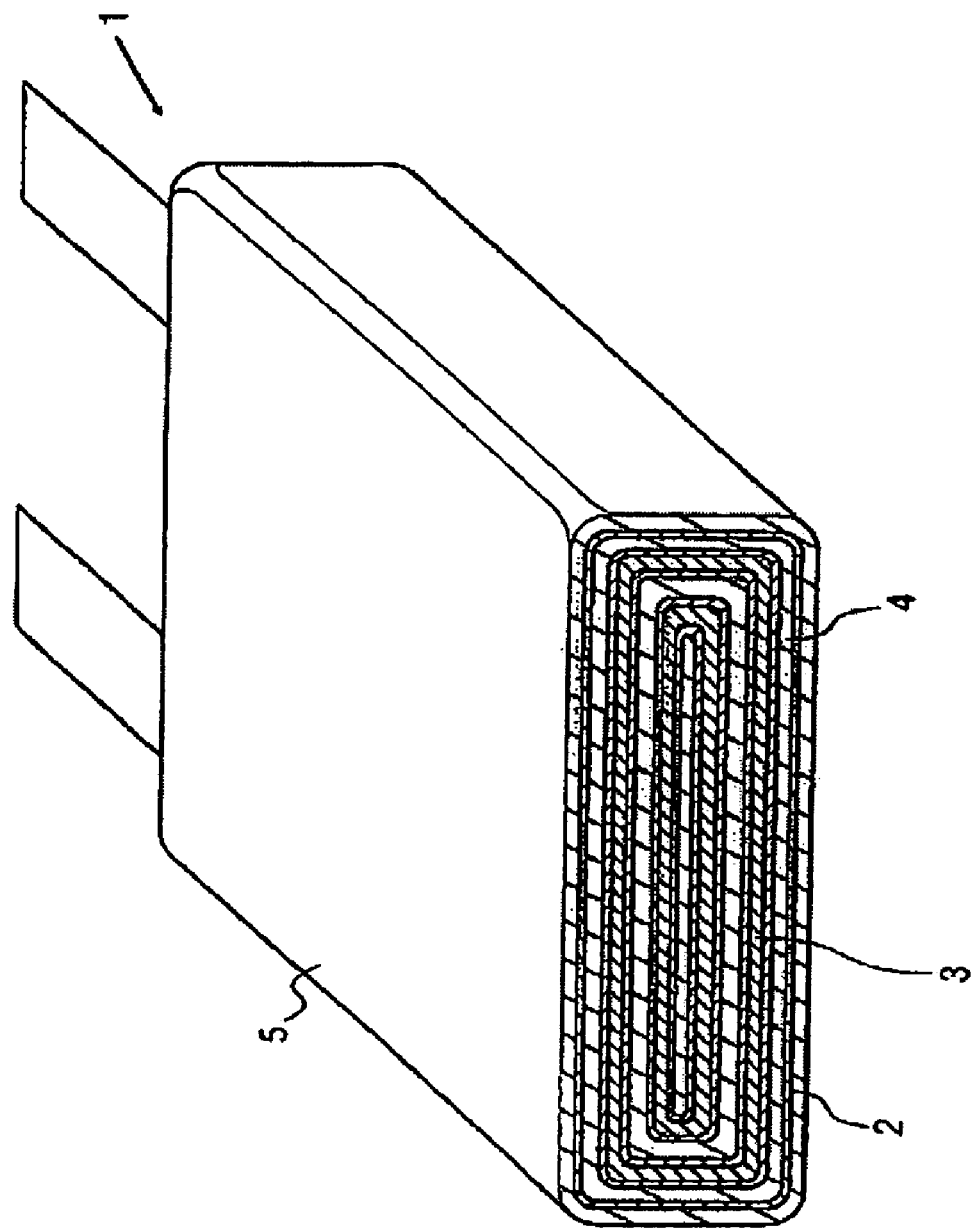
FIG. 19 is a battery according to the present invention.

An example of a lithium-sulfur battery according to the invention is shown in FIG. 19. The lithium-sulfur battery 1 includes a positive electrode 3, a negative electrode 4, and a separator 2 interposed between the positive electrode 3 and the negative electrode 4. The positive electrode 3, the negative electrode 4, and the separator 2 are contained in a battery case 5. The electrolyte is present between the positive electrode 3 and the negative electrode 4.

The following examples further illustrate the present invention in detail, but are not to be construed to limit the scope thereof.

Test 1: Properties of Non-Aqueous Electrolyte $SiH(CH_3)_2OSiH(CH_3)_2$ was hydration-reacted with $CH_2=CHCH_2CH_2O(C_2H_5O)_3CH_3$ in the presence of a platinum chloride catalyst to prepare a polyether-modified silicon oil represented by formula 7. The prepared silicon oil is referred to as oil 1. Oil 1 was one with an $R_1$ to $R_6$ Of $CH_3$, a Z of CH3, a k of 0, an m of 4, and an n of 3, in formula 1.

$Si(CH_3)_3OSiH(CH_3)_2$ was hydration-reacted with $CH_2=CHCH_2CH_2O(C_2H_5O)_3CH_3$ in the presence of platinum chloride catalyst to prepare a polyester-modified silicon Each of oils 1 to 3 was mixed with ethylene carbonate (EC) at a ratio shown in Table 1 to prepare mixed solvents. The mixed solvents were combined with $LiPF_6$ at the concentration of 1M/L to prepare a non-aqueous solvent. The obtained non-aqueous solvents were labeled as Experiments 1 to 6. In Table 1, the mixing ratios of oils 1 to 3 and EC were volume ratios. In addition, the ionic conductivity and viscosity of the non-aqueous electrolytes according to Experiments 1 to 6 were measured. The results are shown in Table 1. The ionic conductivity was measured at 20° C. and 0° C., and the viscosity was measured at 25° C.

TABLE 1

| | $LiPF_6$ (M/L) | Mixing ratio of EC | Mixing ratio of oil 1 | Mixing ratio of oil 2 | Mixing ratio of oil 3 | Compound for forming thin layer | Ionic conductivity (mS/cm: 20° C.) | Ionic conductivity (mS/cm: 0° C.) | Viscosity (cSt) |
|---|---|---|---|---|---|---|---|---|---|
| Experiment 1 | 1 | 5 | 5 | — | — | No | 4.2 | 1.73 | 19.0 |
| Experiment 2 | 11 | 8 | 2 | — | — | No | 6.5 | Freezing | 10.0 |
| Experiment 3 | 1 | 5 | — | 5 | — | No | 4.3 | Freezing | 12.0 |
| Experiment 4 | 1 | 8 | — | 2 | — | No | 6.8 | 3.7 | 9.0 |
| Experiment 5 | 1 | 5 | — | — | 5 | No | 3.8 | Freezing | 22.5 |
| Experiment 6 | 1 | 8 | — | — | 2 | No | 6.0 | Freezing | 14.0 |
| Experiment 7 | 1 | 8 | — | — | — | Yes | — | — | — |
| Experiment 8 | 1 | 8 | 2 | 2 | — | Yes | — | — | — |
| Experiment 9 | 1 | 8 | — | — | 2 | Yes | — | — | — | oil represented by formula 8. The prepared silicon oil is referred to as oil 2. Oil 2 was one with $R_1$ to $R_7$ of $CH_3$, a Z of $CH_3$, a k of 0, an m of 4, and an n of 3, in formula 2.

$Si(CH_3)_2OSiH(CH_3)OSi(CH_3)_3$ was hydration-reacted with $CH_2=CHCH_2CH_2O(C_2H_5O)_3CH_3$ in the presence of platinum chloride catalyst to prepare a polyester-modified silicon oil represented by formula 9. The prepared silicon oil is referred to as oil 3.

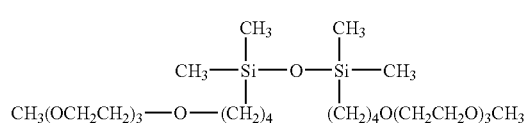

(7)

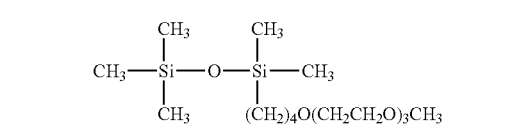

(8)

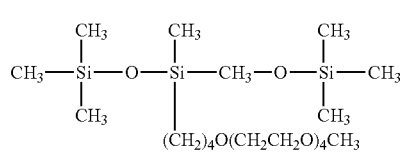

(9)

Oil 1 has a viscosity of 9.7 cSt at 25° C., oil 2 has a viscosity of 4.9 cSt at 25° C., and oil 3 has a viscosity of 9.4 cSt at 25° C. Oils 1 and 2 are liquid at −40° C., and oil 3 is a solid at −40° C.

The flash points of oils 1 and 2 were measured under a flash point test of the Japanese Industrial Standard (JIS)-K2265 at a temperature between room temperature and 160° C., and the results showed that oils 1 and 2 have no flash point within this range. Thus, oils 1 and 2 have a flash point of at least 160° C.

The non-aqueous electrolytes according to Experiments 1 to 4 including polyether-modified silicon oils (oils 1 and 2) in which a polyether group was bonded to a terminal end of a polysiloxane chain, and the non-aqueous electrolyte according to Experiments 5 and 6 included a polyether-modified silicon oil (oil 3) in which a polyether group was bonded to approximately the middle of the polysiloxane chain.

When the viscosities of the non-aqueous electrolytes according to Experiments 1, 3, and 5 with a 5:5 ratio of EC and one of oils 1 to 3 are compared, the viscosity of the non-aqueous electrolyte according to Experiment 5 is higher than that according to Experiments 1 and 3. It is considered that the higher viscosity of Experiment 5 causes lower ionic conductivity than those according to Experiments 1 or 3. In addition, it is shown that the non-aqueous electrolyte according to Experiment 1 including oil 1 with two polyether chains has better low-temperature ionic conductivity than those according to Experiments 3 and 5, because those according to Experiments 3 and 5 were frozen at 0° C.

When the viscosities of the non-aqueous electrolytes according to Experiments 2, 4, and 6 with an 8:2 ratio of EC and one of oils 1 to 3 are compared, the viscosity of the non-aqueous electrolyte according to Experiment 6 is higher than those according to Experiments 2 and 4. It is considered that the higher viscosity of Experiment 6 causes lower ionic conductivity than those according to Experiments 2 or 4. In addition, it is shown that the non-aqueous electrolyte according to Experiment 4 including oil 2 with one polyether chain has better low-temperature ionic conductivity than those according to Experiments 2 and 6, because those according to Experiments 2 and 6 were frozen at 0° C.

These results indicated that the non-aqueous electrolyte including oils 1 or 2 with a linear structure (Experiments 1 to 4) are suitable for rechargeable lithium batteries compared with the non-aqueous electrolyte including oil 3 with a branch structure (Experiments 5 and 6), because the electrolyte with oils 1 or 2 has higher ionic conductivity than that with oil 3.

Test 2: Performances of Rechargeable Lithium Cells

Sheet-type positive electrodes with a LiCoO$_2$ positive active material, a polyvinylidene fluoride binder, a carbon black conductive agent, and an Al foil current collector were assembled with a sheet-type negative electrode with a graphite negative active material, a polyvinylidene fluoride binder, and a Cu current collector together with a polypropylene separator to prepare an electrode element. The electrode elements were respectively inserted into battery cases with the non-aqueous electrolytes according to Experiments 1 to 6 followed by sealing the battery cases, thereby fabricating coin-type rechargeable lithium cells with a diameter of 20 mm and a height of 1.6 mm, having a nominal charge and discharge capacity of 5 mAh (Experiments 1 to 6).

Figure 4:
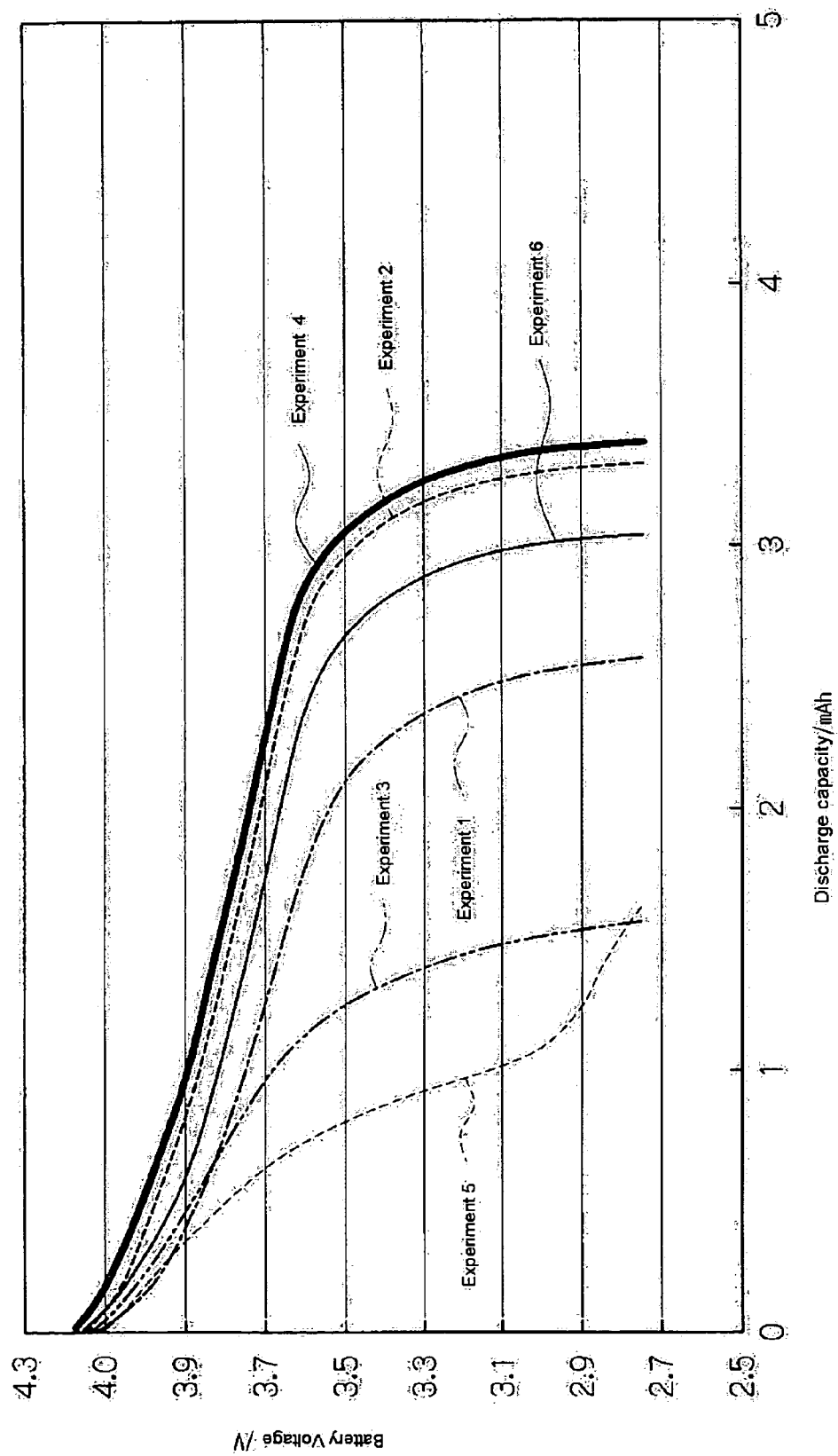
FIG. 4 is a graph showing discharge profiles of rechargeable lithium batteries according to Experiments 1 to 4.
Figure 5:
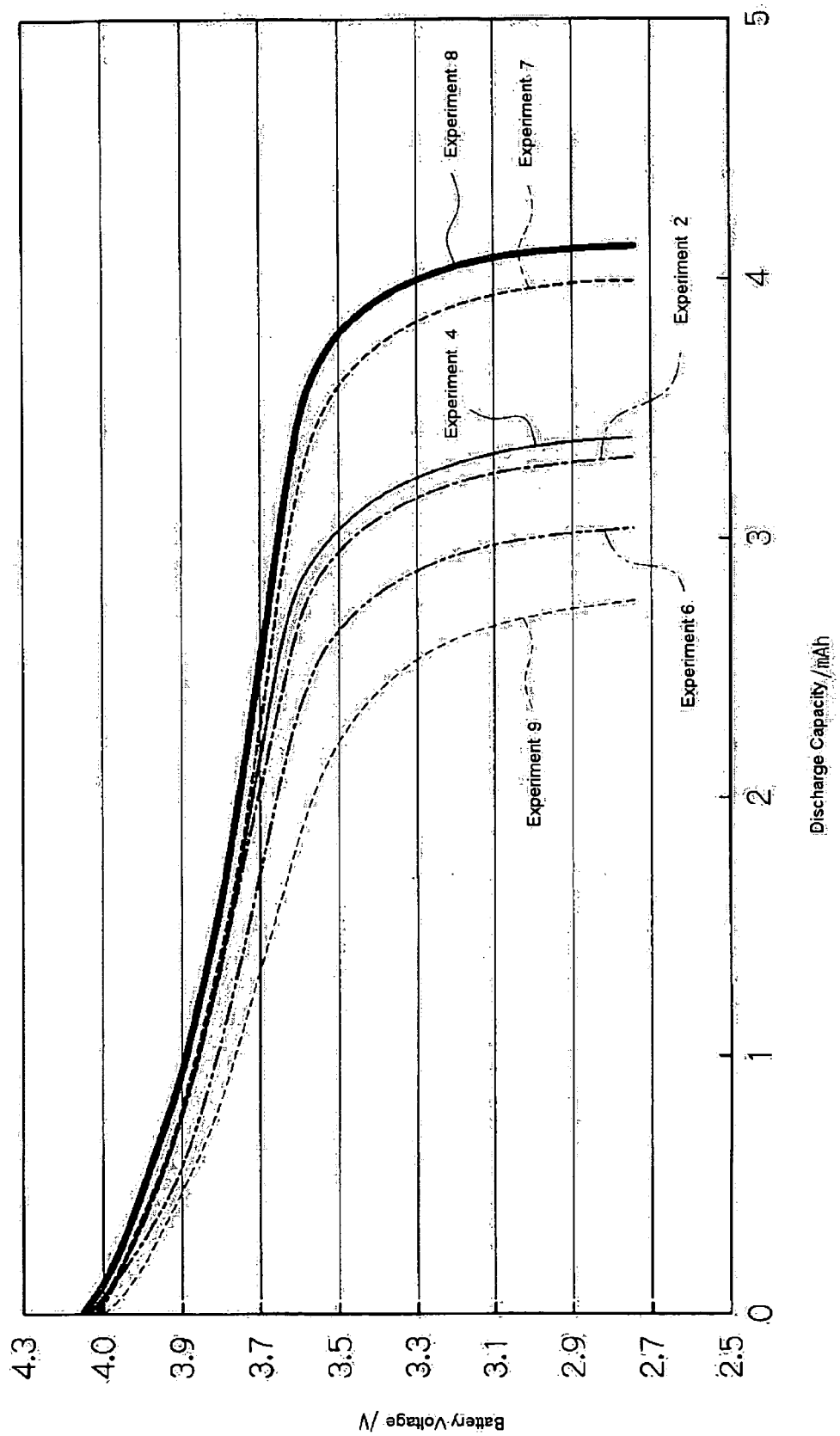
FIG. 5 is a graph showing discharge profiles of rechargeable lithium batteries according to Experiments 2, 4, and 6 to 9.

Each cell was constant-current charged at 0.2 C by 4.2V of a battery voltage and constant-voltage charged for 9 hours. Thereafter, the charged cells were discharged at 0.2 C by 2.75V of the battery voltage. The discharge capacity of the cells was measured. The results are shown in FIGS. 4 and 5.

In addition, a compound for forming a thin layer was added to each of the non-aqueous electrolytes according to Experiments 2, 4, and 6 to prepare an electrolyte. Using the electrolyte, coin-type rechargeable lithium cells were fabricated. The discharge capacities of the cells were measured.

The compound for forming a thin layer used a mixture of a polyacrylate compound (referred to as PAA) represented by formula 10, and a mixture (referred to as TAZO) of tetramethylolmethane-tri-β-aziridinylpropionate represented by formula 11 and a compound with an R$_2$ of H at a ratio of 26:75.

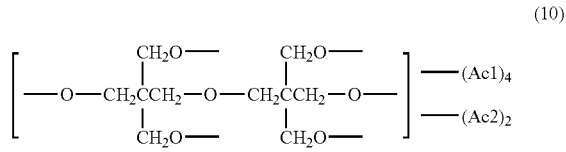

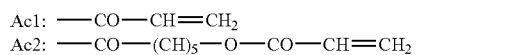

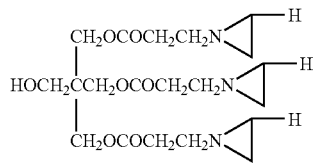

0.2 wt % of PM and 1 wt % of TAZO were added to the non-aqueous electrolytes according to Experiments 2, 4, and 5, to prepare non-aqueous electrolytes according to Experiments 7, 8, and 9. The compositions thereof are shown in Table 1.

Rechargeable lithium cells according to Experiments 7 to 9 were fabricated by the same procedure as in Experiments 1 to 6 except that the non-aqueous electrolytes according to Experiments 7 to 9 were used.

The cells according to Experiments 7 to 9 were constant-current charged at 0.2 C by 3V of a battery voltage and constant-voltage charged for 4 hours followed by constant-current charging at 0.2 C by 4.2V and constant-voltage for 9 hours (2 step charge). The 2 step charge is referred to as initial charge (formation). According to the initial charge, a thin layer was formed on a surface of the negative electrodes.

The cells were discharged at 0.2 C by 2.75V. The discharge capacity was measured and the results are shown in FIG. 5.

FIG. 4 shows that the discharge capacities of the cells according to Experiments 2, 4, and 6 are higher than those of the cells according to Experiments 1, 3, and 5. These results are believed to occur because that the electrolytes according to Experiments 2, 4, and 6 used in the relatively large amount of EC and have low viscosity which results in an increase in ionic conductivity.

It is evident from FIG. 5 that the cells with the compound for forming a thin layer (Experiments 7 and 8) exhibit surprisingly improved discharge capacity than the cells without the compound (Experiments 2, 4, and 6). Furthermore, the cells according to Experiments 7 and 8 including polyether-modified silicon oil (oils 1 and 2) with a linear structure exhibit better discharge capacity than the cell according to Experiment 9 including a polyester-modified silicon oil (oil 3) with a branch structure.

The flash points of the non-aqueous electrolytes according to Experiments 1 to 9 and the conventional electrolyte were measured. The flash point of the conventional electrolyte was 58° C. and those of the electrolytes according to Experiments 1 to 9 were a temperature between room temperature and 160° C. These results are considered to occur because the electrolytes according to Experiments 1 to 9 include materials with a flash point of 160° C. or less.

The conventional electrolyte was obtained by dissolving 1.3 M/L of LiPF$_6$ in a mixed solvent of ethylene carbonate (EC) and diethylcarbonate (DEC) (volume ratio of EC:DEC is 3:7). The flash point was measured under a flash point test of the Japanese Industrial Standard (JIS)-K-2265 at a temperature between room temperature and 160° C.

Test 3: Performances of Rechargeable Lithium Batteries

COMPARATIVE EXAMPLE 1

1.3 M/L of LiPF$_6$ was dissolved in a mixed solvent of ethylene carbonate (EC) and diethyl carbonate (DEC) (volume ratio of EC:DEC=3:7) to prepare a non-aqueous electrolyte.

Example 1

10 volume % of oil 1 represented by formula 7 was added to the non-aqueous electrolyte according to Comparative Example 1 to prepare a non-aqueous electrolyte.

Example 2

10 volume % of oil 2 represented by formula 8 was added to the non-aqueous electrolyte according to Comparative Example 1 to prepare a non-aqueous electrolyte.

Example 3

0.2 wt % of PAA and 1 wt % of TAZO were added to the non-aqueous electrolyte according to Example 1 to prepare a non-aqueous electrolyte.

Example 4

0.2 wt % of PAA and 1 wt % of TAZO were added to the non-aqueous electrolyte according to Example 2 to prepare a non-aqueous electrolyte.

COMPARATIVE EXAMPLE 2

10 volume % of oil 3 represented by formula 9 was added to the non-aqueous electrolyte according to Comparative Example 1 to prepare a non-aqueous electrolyte.

COMPARATIVE EXAMPLE 3

0.2 wt % of PAA and 1 wt % of TAZO were added to the non-aqueous electrolyte according to Comparative Example 2 to prepare a non-aqueous electrolyte.

Using the non-aqueous electrolytes according to Examples 1 to 4, and Comparative Examples 1 to 3, rechargeable lithium cells according to Examples 1 to 4 and Comparative Examples 1 to 3 were fabricated by the same procedure in Test 2.

Each of the cells according to Examples 1 and 2 and Comparative Examples 1 and 2 was constant-current charged at 0.5 C by 4.2V of a battery voltage and constant-voltage for 9 hours. Thereafter, the charged cells were respectively discharged at 0.2 C, 0.5 C, 1.0 C, and 2.0 C by 2.75V of a battery voltage and the discharge capacity at each rate was measured. The results are shown in FIGS. 6 and 7.

Each of the cells according to Examples 3 and 4 and Comparative Example 3 was constant-current charged at 0.2 C by 3V of a battery voltage and constant-voltage for 4 hours followed by constant-current charge at 0.2C by 4.2V of a battery voltage and constant-voltage charge for 9 hours (2 step charge). The 2 step charge is referred to as initial charge (formation). According to the initial charge, a thin layer was formed on a surface of the negative electrode.

Thereafter, the charged cells were discharged at various rates of 0.2C, 0.5C, 1.0C and 2.0C by 2.75V of a battery voltage and the discharge capacity was measured at each rate. The results are shown in FIGS. 6 and 7.

Figure 6:
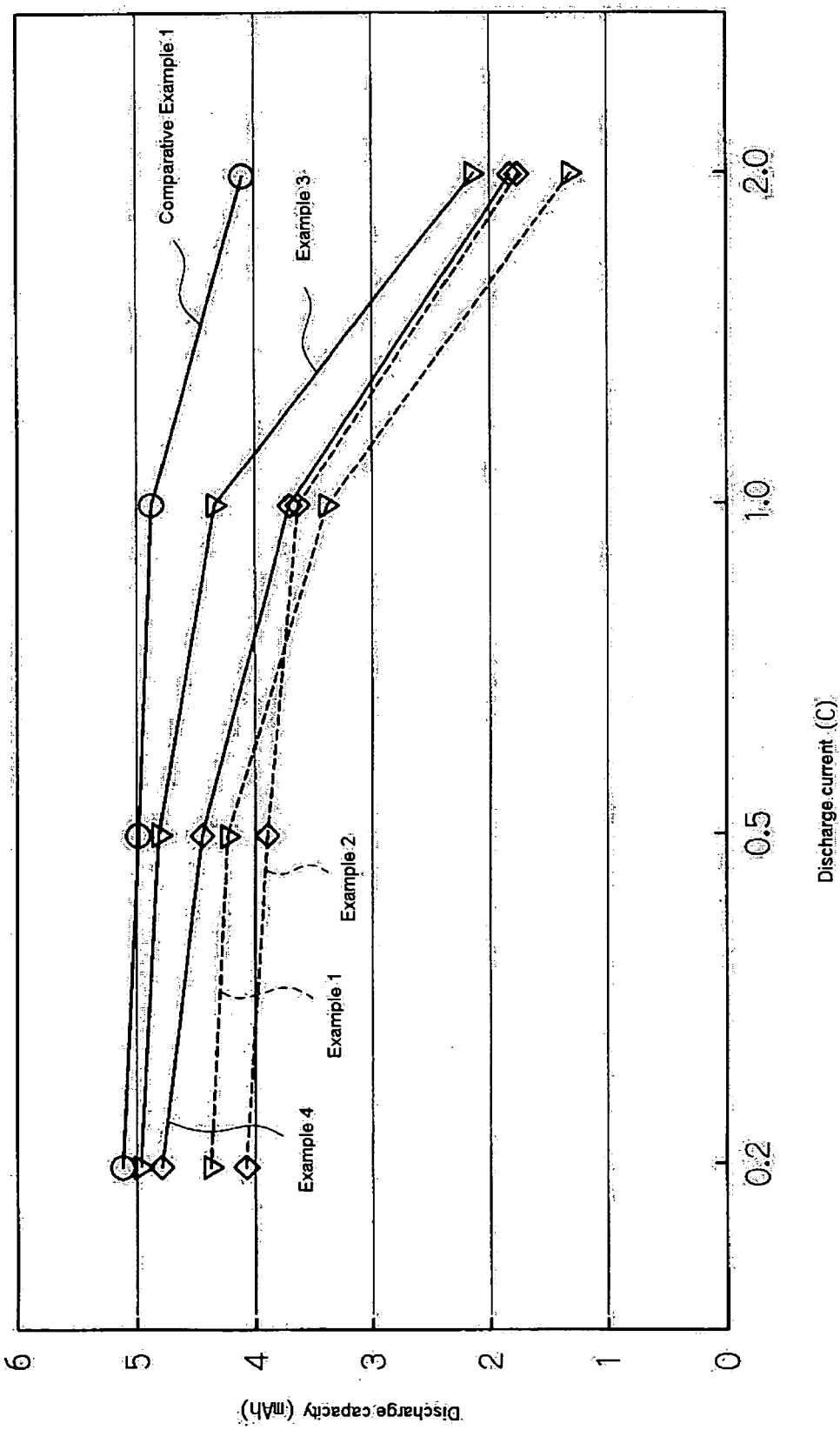
FIG. 6 is a graph showing a relationship between discharge current and discharge capacity of rechargeable lithium batteries according to Examples 1 to 4 of the present invention and Comparative Example 1.
Figure 7:
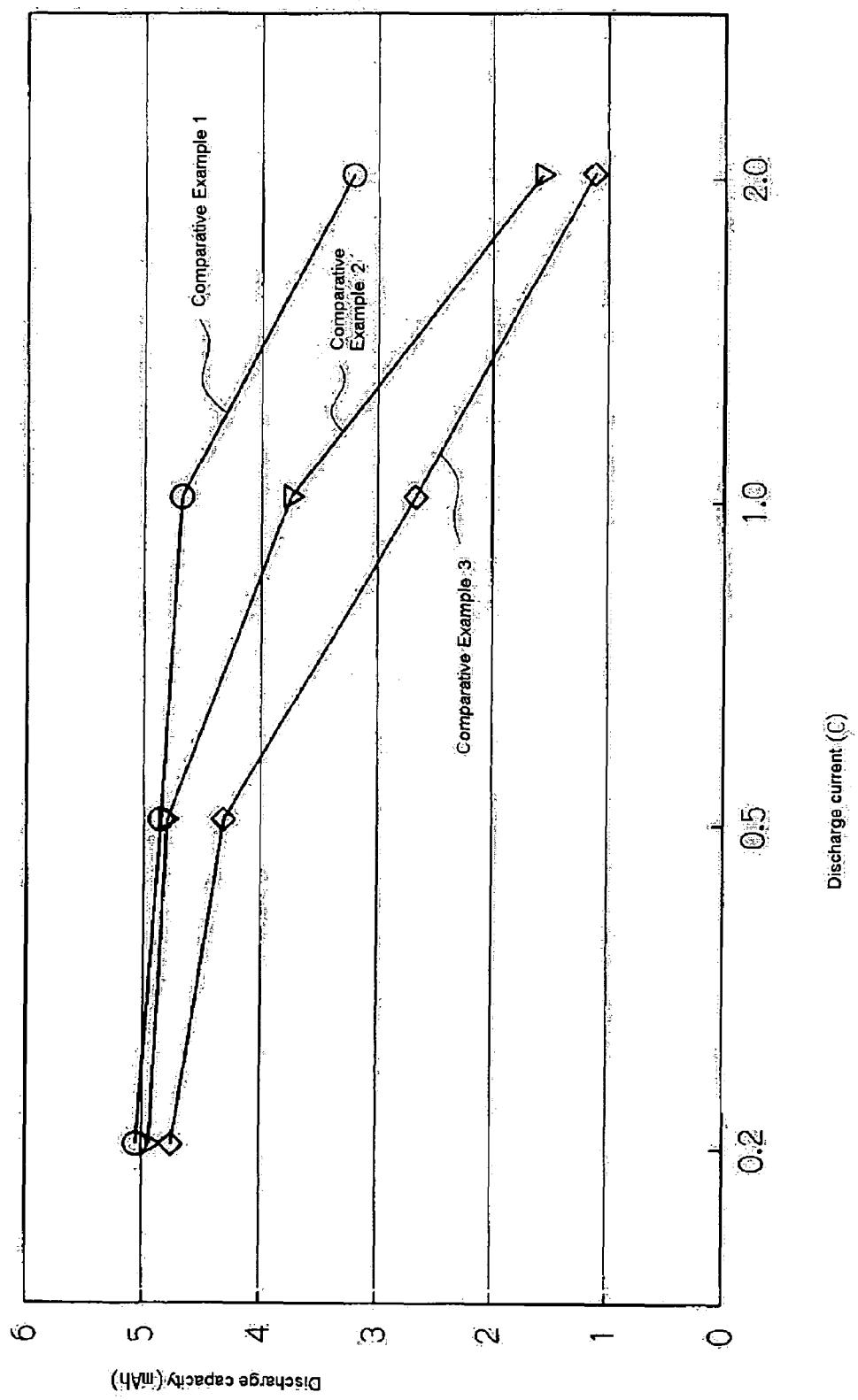
FIG. 7 is a graph showing a relationship between discharge current and discharge capacity of rechargeable lithium batteries according to Comparative Examples 1 to 3.

It is evident from FIG. 6 that the discharge capacities according to Examples 3 and 4 are higher than those according to Examples 1 and 2 at a discharge current between 0.2 and 1.0C. This result is believed to increase because of the prevention of the decomposition of oils 1 and 2 by the thin layer.

FIGS. 6 and 7 indicated that the cell according to Comparative Example 2 exhibits a substantially corresponding discharge capacity to that according to Example 3 at all rates, but that according to Comparative Example 3 exhibits lower discharge capacity than those according to Examples 1 to 4 at 1.0 to 2.0C.

Figure 8:
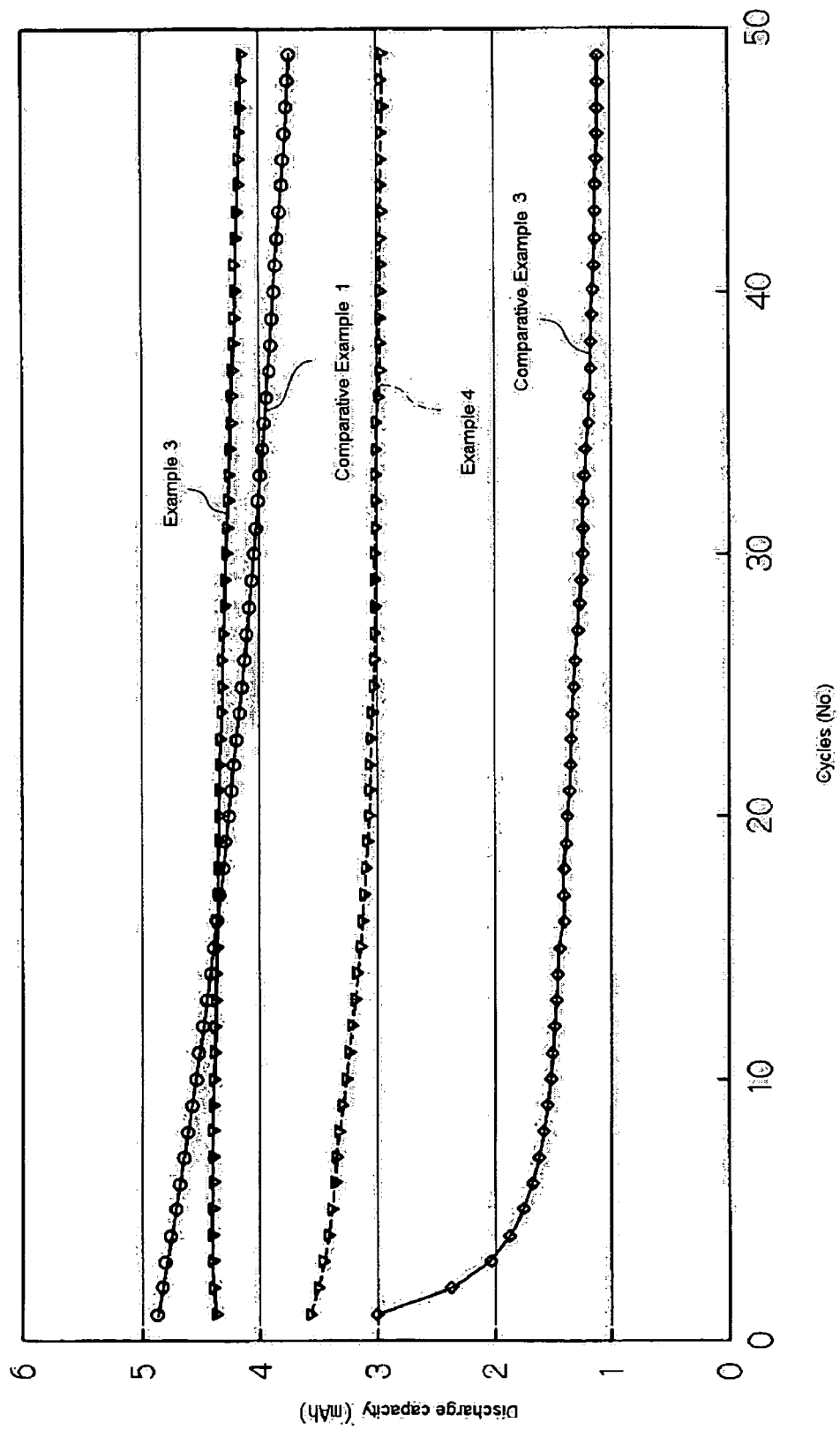
FIG. 8 is a graph showing a relationship between cycles and discharge capacity of rechargeable lithium batteries according to Examples 3 and 4 of the present invention, and Comparative Examples 1 and 3.

The cycle life characteristic at 1C is presented in FIG. 8. It is evident from FIG. 8 that the cycle life characteristic of the cell according to Example 3 is better than that of the cell according to Comparative Example 1.

The cell according to Example 4 exhibits lower discharge capacity, but a smoother slope than Comparative Example 1. Such smooth slope indicates that the discharge capacity retention in Example 4 is better than Comparative Example 1.

The cell according to Comparative Example 3 exhibits lower discharge capacity than Example 4, and a more abrupt slope than Example 4. Such abrupt slope indicates that the discharge capacity retention in Comparative Example 3 is worse than in Example 4.

These results indicate that rechargeable lithium cells according to Examples 3 and 4 with the non-aqueous electrolyte having the compound for forming the thin layer exhibit good cycle life characteristics.

Example 5

Thereafter, a polyether-modified silicon oil represented by formula 12 was prepared. The prepared oil was referred to as oil 4. Oil 4 was one with an $R_1$ to $R_6$ of $CH_3$, a Z of $CH_3$, a k of 0, an m of 4, and an n of 2, in formula 1.

10 volume % of oil 4 represented by formula 12 was added to the non-aqueous electrolyte according to Comparative Example 1 to prepare a non-aqueous electrolyte.

Using the non-aqueous electrolyte according to Example 5, a rechargeable lithium battery according to Example 5 was fabricated by the same procedure as in Example 2.

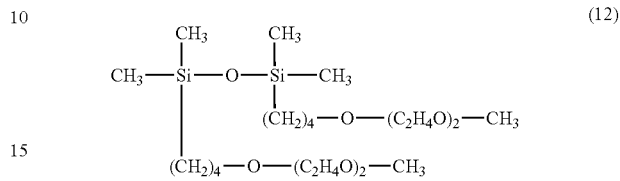

(12)

The cell was constant-current charged at 0.5C by 4.2V of a battery voltage and constant-voltage charged for 9 hours. Thereafter, the charged cell was discharged at various rates of 0.2C, 0.5C, 1.0C, and 2.0C by 2.75V of a battery voltage and the discharge capacities were measured at each rate. The results are presented in FIG. 9. The results of the cells according to Example 1 and Comparative Example 1 are also presented in FIG. 9.

Figure 9:
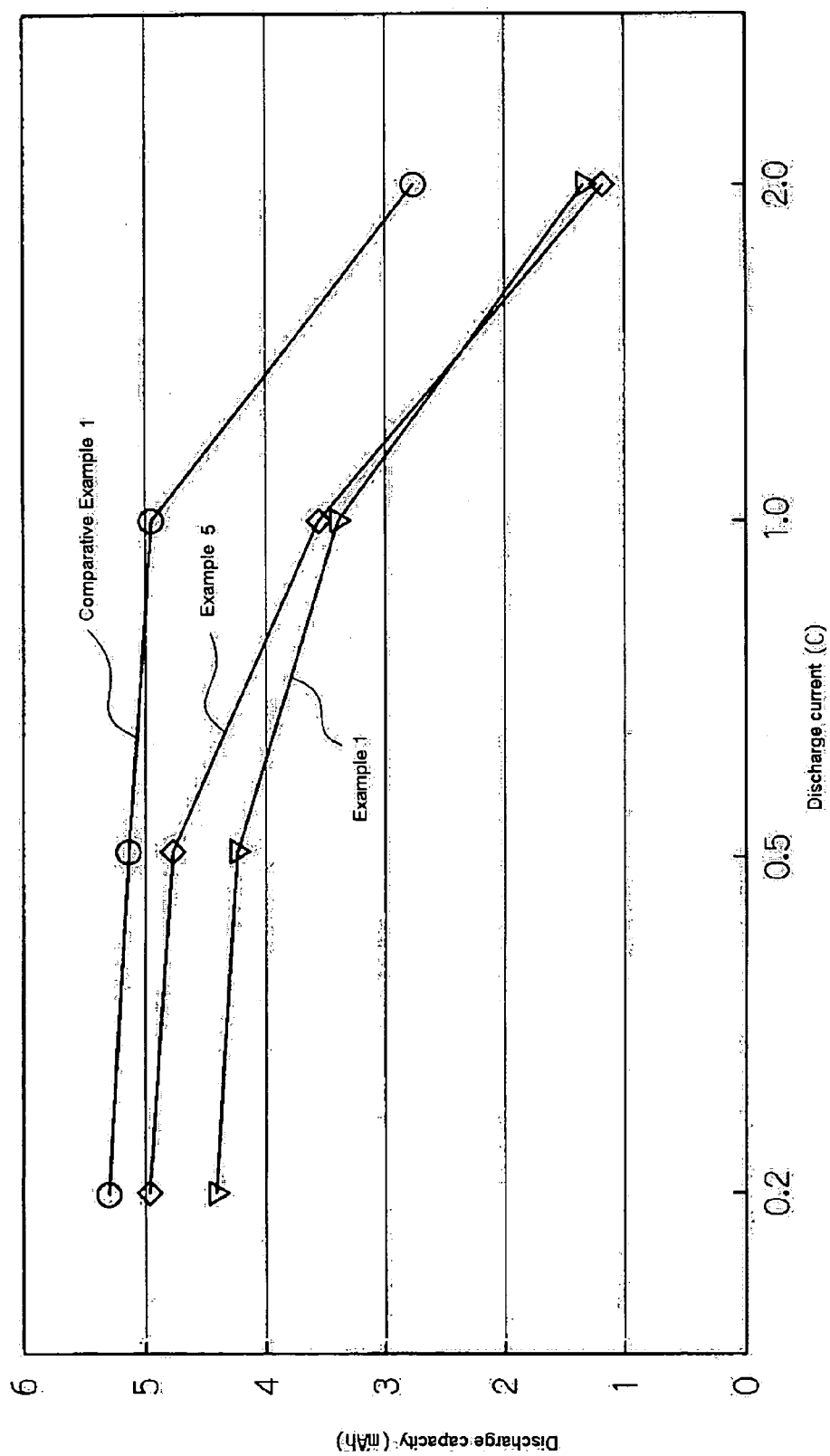
FIG. 9 is a graph showing a relationship between discharge current and discharge capacity of rechargeable lithium batteries according to Examples 1 and 4 of the present invention, and Comparative Example 1.

It is evident from FIG. 9 that the cell according to Example 5 exhibits an improved discharge capacity over Example 1 at 0.2C and 0.5C.

The improved discharge capacity is believed to occur because of the following reasons.

Figure 10:
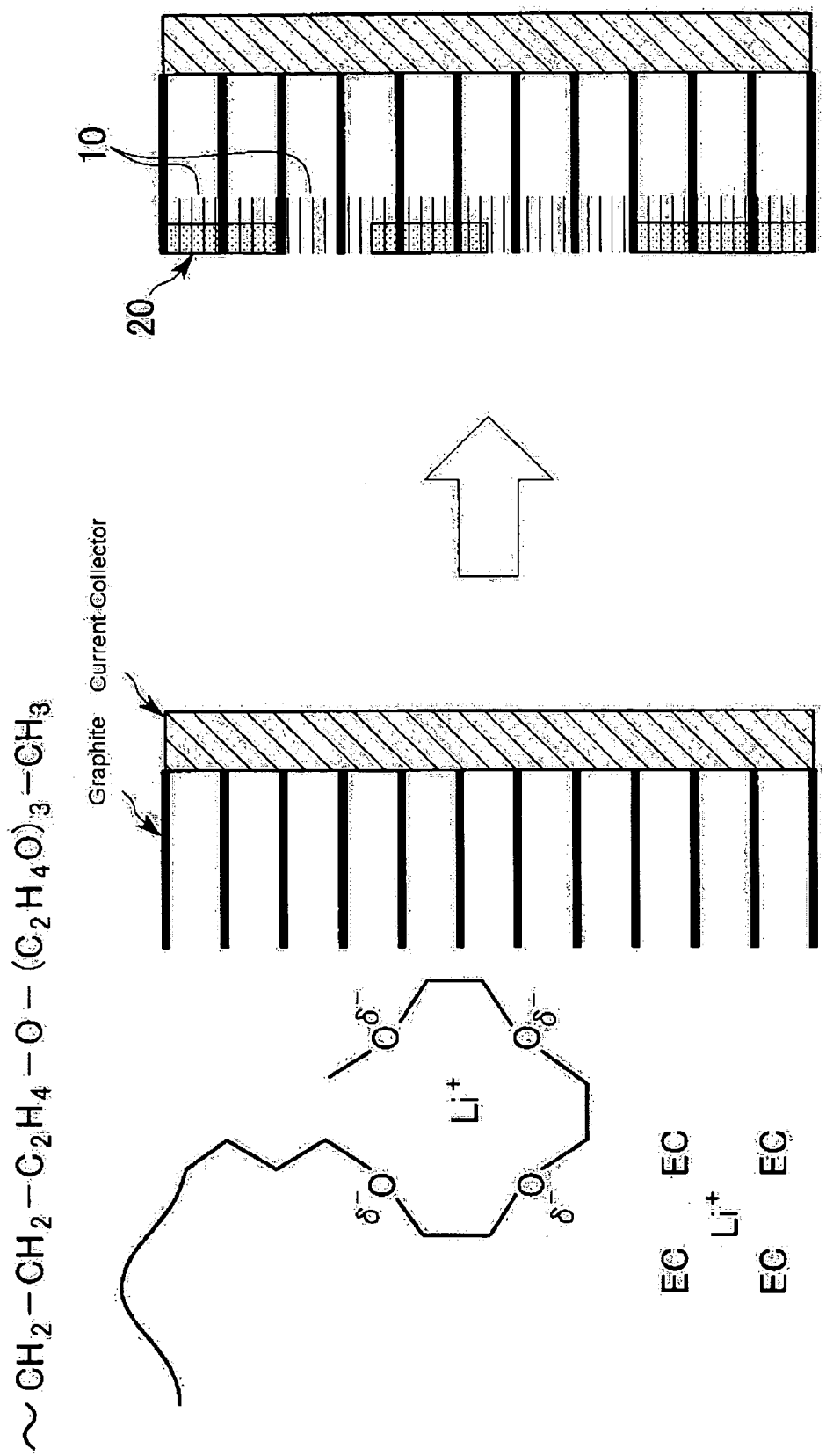
FIG. 10 is a drawing illustrating a reaction mechanism occurring during the initial charging of a rechargeable lithium battery with an electrolyte according to Example 1 of the present invention.

Oil 1 with an n of 3 in formula 3 included in the electrolyte according to Example 1 is solely coordinated into lithium ions (Li+) as shown in FIG. 10. Furthermore, the lithium ions (Li+) coordinated by EC are also present in the electrolyte according to Example 1. During the initial charge, one thin layer 10 derived from EC and the other thin layer 20 derived from the decomposition of silicon oil are formed on a surface of a negative electrode via a competition reaction, as shown in FIG. 10. As a result, the thin layer 20 through which lithium ions do not passed present on the surface of the negative electrode.

Figure 11:
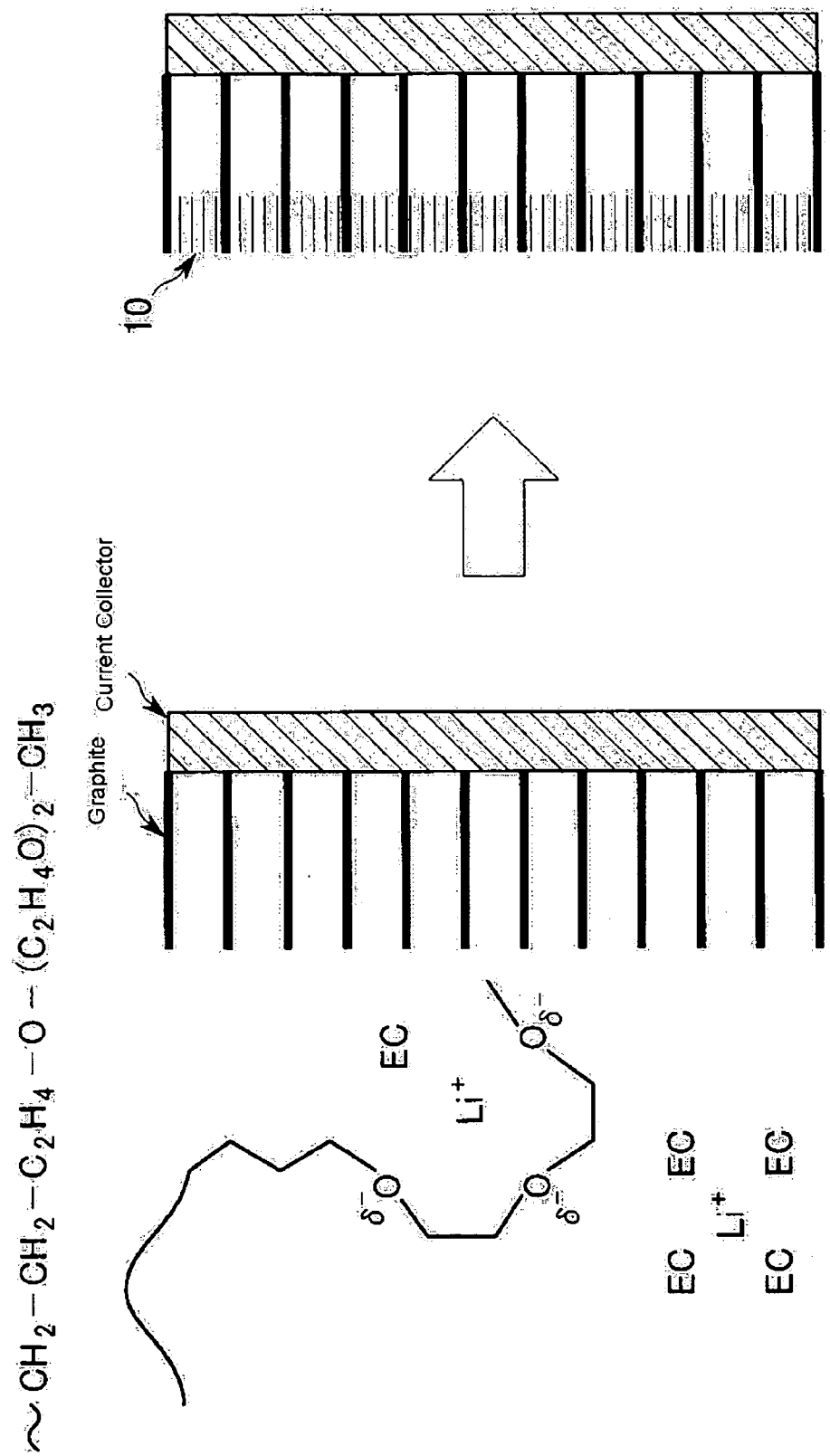
FIG. 11 is a drawing illustrating a reaction mechanism occurring during the initial charging of a rechargeable lithium battery with an electrolyte according to Example 5 of the present invention.

Whereas, oil 4 with an n of 2 in formula 1 is included in the non-aqueous electrolyte according to Example 5. Oil 4 is unable to coordinate to lithium ions (Li+) because of the small value of n, as shown in FIG. 11. The lithium ions coordinate with EC in the electrolyte, as shown in FIG. 11. Such a coordination between the lithium ions and only EC allows formation of a thicker thin layer on a surface of the negative electrode than in Example 1. As a result, the electrolyte according to Example 5 produces a more suitable thin layer than that according to Example 1 and increases the discharge capacity than Example 1 at 0.2C and 0.5C.

Test 4: Performances of the Non-Aqueous Electrolyte and Rechargeable Lithium Cell $Si(CH_3)_3OSiH(CH_3)_2$ was hydration-reacted with $CH_2=CHCH_2O(C_2H_5O)_2CH_3$ in the presence of a platinum chloride catalyst to prepare a polyether-modified silicon oil represented by formula 13. The prepared silicon oil is referred to as oil 5. Oil 5 was one with an $R_1$ to $R_7$ of $CH_3$, a Z of CH3, a k of 0, an m of 3, and an n of 2, in formula 1.

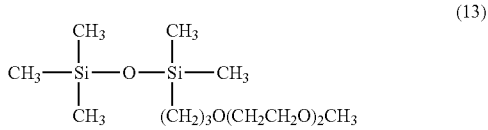

(13)

Oil 5 was then vacuum-distillated to remove Pt and BHT. The obtained product is referred to as oil 7. In addition, oil 7 was repeatedly vacuum-distillated to prepare oil 6.

Oil 5 has a viscosity of 2.6 cP (3.7 cSt) at 25° C. The flash point of oil 5 was measured using a flash point test of the Japanese Industrial Standard (JIS)-K2265 at a temperature between room temperature and 120° C., and the result showed that oil 5 has no flash point within this range. Thus, oil 5 has a flash point of at least 120° C.

The amounts of Pt and BHT included in oils 5 to 7 were measured. The amount of Pt was determined by ICP atomic emission spectrometry and the amount of BHT was determined by gas chromatography. The amount of Pt was 5 ppm and that of BHT was 60 ppm in the oil 5. However, the amounts of Pt and BHT were less than detectable boundary in oils 6 and 7 which were vacuum-distilled.

Example 6

1.3 M/L $LiPF_6$ was dissolved in a mixed solvent of ethylene carbonate and diethyl carbonate (3:7 volume ratio) to prepare a first electrolyte. 15 volume % of oil 5 was added to the first electrolyte to prepare a non-aqueous electrolyte.

Example 7

15 volume % of the oil 6 was added to the first electrolyte to prepare a non-aqueous electrolyte.

Example 8

15 volume % of the oil 7 was added to the first electrolyte to prepare a non-aqueous electrolyte.

Example 9

1.3 M/L LiBeti was dissolved in a mixed solvent of ethylene carbonate and diethyl carbonate (3:7 volume ratio) to prepare a second electrolyte. 15 volume % of oil 6 was added to the first electrolyte to prepare a non-aqueous electrolyte.

Example 10

15 volume % of the oil 5 and 5 volume % of monofluoroethylene carbonate were added to the first electrolyte to prepare a non-aqueous electrolyte.

Example 11

15 volume % of the oil 6 and 5 volume % of monofluoroethylene carbonate were added to the first electrolyte to prepare a non-aqueous electrolyte.

The electrolyte according to Example 6 has a viscosity of 5.55cP and a conductivity of 6.1 mS. The electrolytes according to Examples 7 to 11 have the similar results to that according to Example 6. Thus, these results indicated that electrolytes according to Examples 6 to 11 are applicable to rechargeable lithium batteries.

Using the electrolytes according to Examples 6 to 11, pouch-type rechargeable lithium batteries were fabricated. A positive electrode with $LiCoO_2$ positive active material, a polyvinylidene fluoride binder, a carbon black conductive agent, and an Al foil current collector were respectively assembled with a negative electrode with a graphite negative active material, a polyvinylidene fluoride binder, and a Cu foil current collector together with a polypropylene separator to prepare an electrode element. The electrode elements were inserted into battery cases with the non-aqueous electrolytes according to Examples 6 to 11 followed by sealing the battery cases, thereby fabricating pouch-type rechargeable lithium cells having a nominal charge and discharge capacity of 820 mAh.

Each cell was constant-current charged at 0.2C by 4.2V of a battery voltage and constant-voltage charged for 9 hours (2 step charge). The 2 step charge is referred t as initial charge (formation). According to the initial charge, a thin layer was formed on a surface of the negative electrodes.

The cells were respectively discharged at 0.2C, 0.5C, 0.1C and 2.0C by 2.75V, and the discharge capacities were measured at each rate. The results are shown in FIG. 12.

Figure 12:
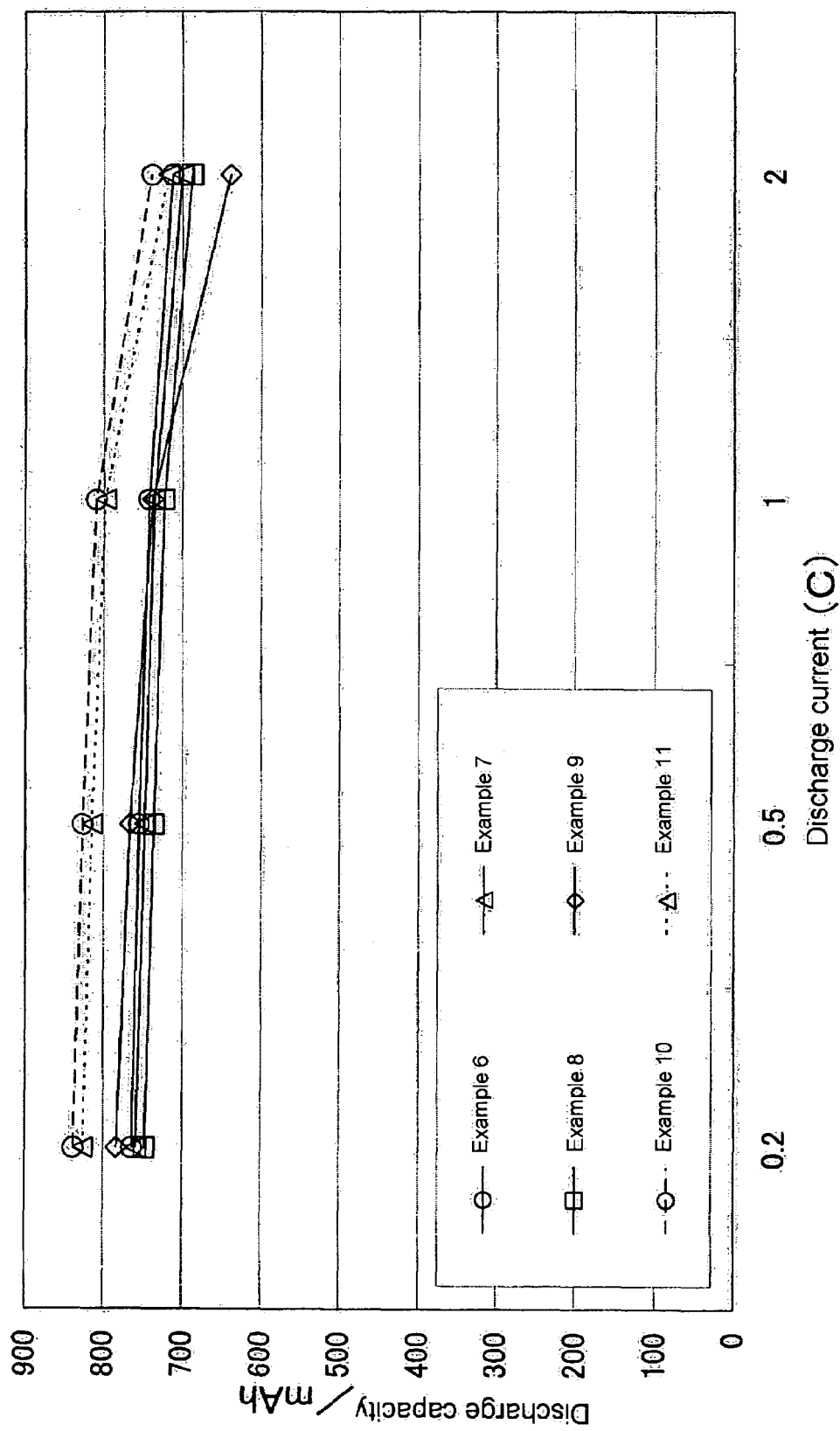
FIG. 12 is a graph showing a relationship between discharge current and discharge capacity of rechargeable lithium batteries according to Examples 6 to 11 of the present invention.

FIG. 12 shows that the discharge capacities were similarly exhibited in the cells according to Examples 6 to 11, and significant differences were showed depending on the type of the lithium salt and whether or not the vacuum-distillation was performed. The discharge capacities of the cells according to Examples 10 and 11 added with FEC were higher than those according to Examples 6 to 9, and they came near the nominal capacity of 820 mAh. These results are believed to occur because a thin layer derived from FEC, on a surface of the negative electrode prevents the decomposition of the non-aqueous electrolyte.

Figure 13:
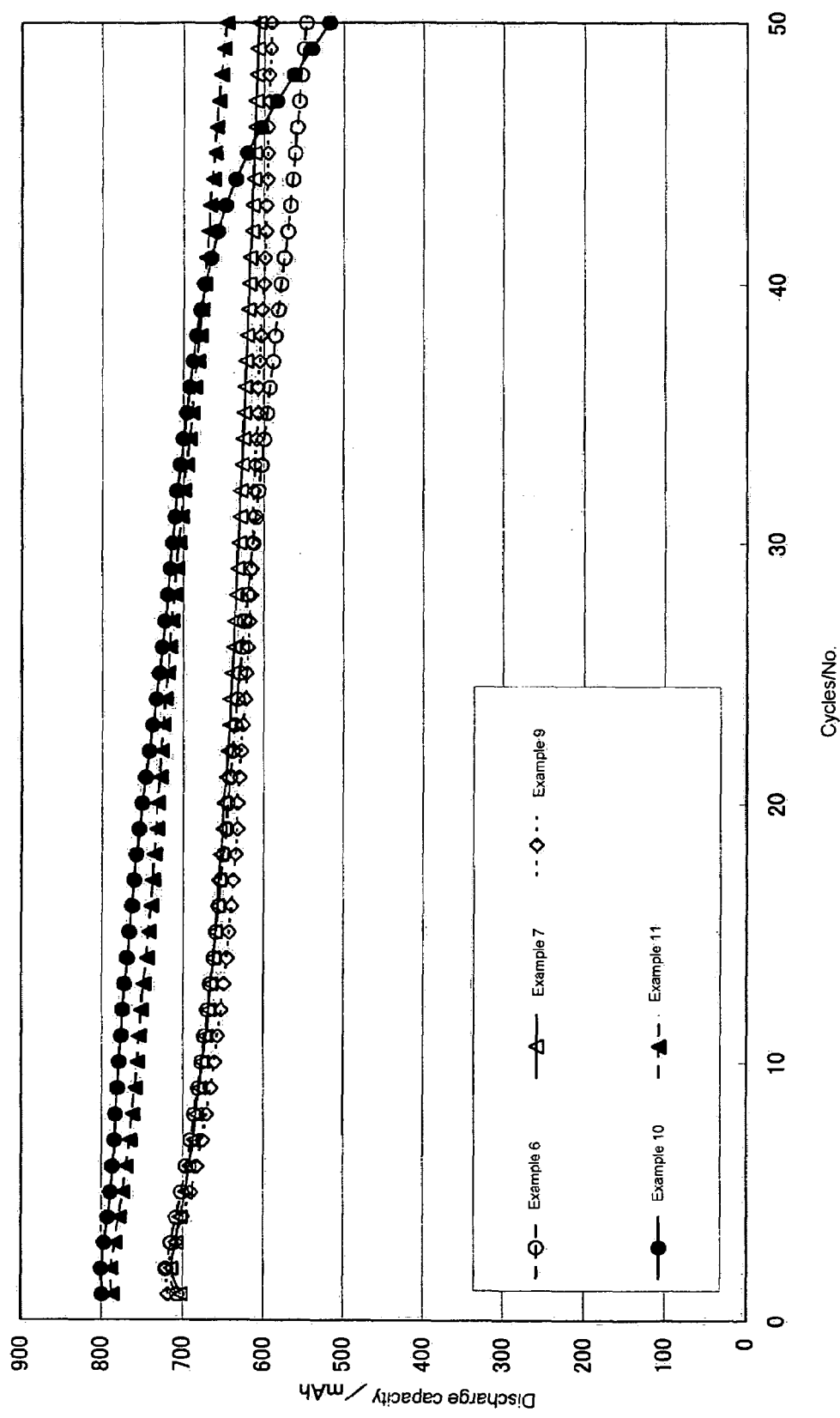
FIG. 13 is a graph showing a relationship between cycles and discharge capacity of rechargeable lithium batteries according to Examples 6 to 11 of the present invention.

FIG. 13 shows the cycle life characteristics at 1C. It is evident from FIG. 13 that the cycle life characteristics of the cells according to Examples 10 and 11 were better than those of the cells according to Examples 6, 7, and 9. However, the cycle life characteristic of the cell according to Example 10 without the vacuum-distillation deteriorated after $40^{th}$ cycles. In addition, the cycle life characteristic of the cell according to Example 7 with the vacuum-distillation was better than that of the cell according to Example 6. These results indicate that the vacuum-distillation can improve the cycle life characteristics. Such an improvement is believed to occur because Pt and BHT are removed by the vacuum-distillation.

The cell according to Example 9 using the LiBeti salt initially showed a cycle life characteristic corresponding to that of Example 7. FIG. 13 shows the results for up to 50 cycles. However, as charge and discharge cycles were repeated, the cell according to Example 9 showed a better cycle life characteristic than that according to Example 7. Thus, the LiBeti salt exhibited a better cycle life characteristic than $LiPF_6$.

Figure 14:
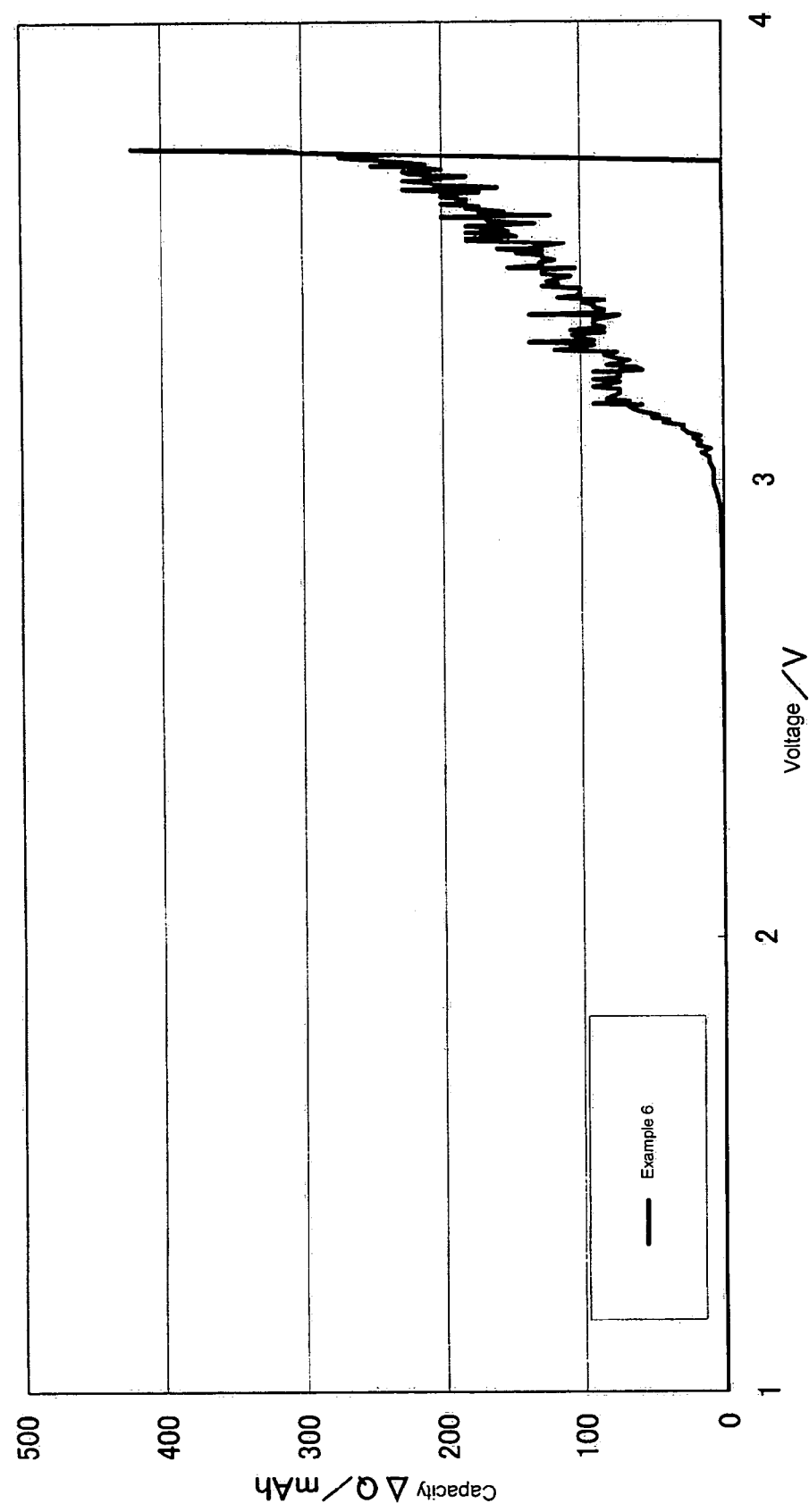
FIG. 14 is a profile showing columbic efficiency and charge voltage during initial charging of rechargeable lithium battery according to Example 6 of the present invention.
Figure 15:
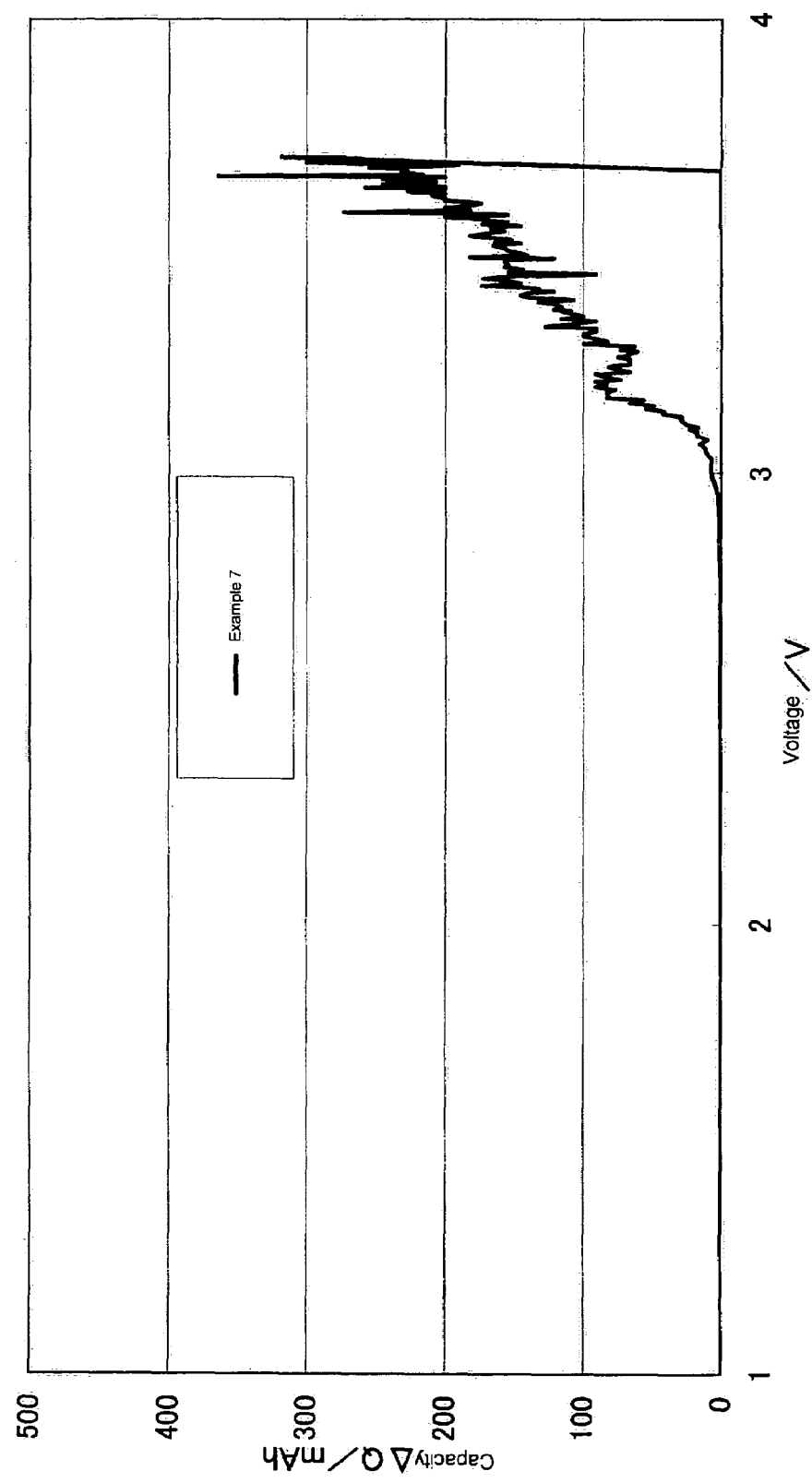
FIG. 15 is a profile showing columbic efficiency and charge voltage during initial charging of rechargeable lithium battery according to Example 7 of the present invention.
Figure 16:
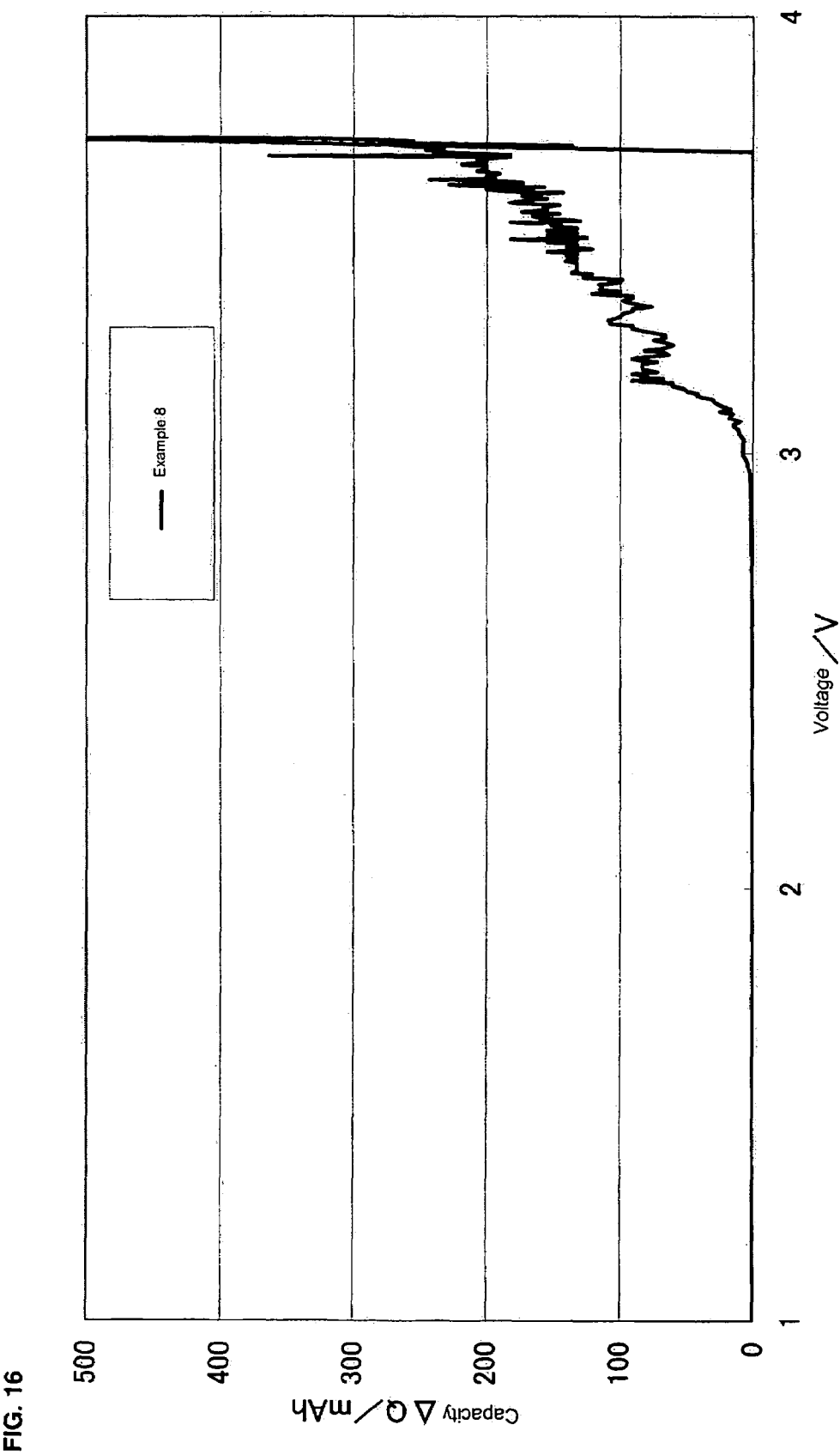
FIG. 16 is a profile showing columbic efficiency and charge voltage during initial charging of rechargeable lithium battery according to Example 8 of the present invention.
Figure 17:
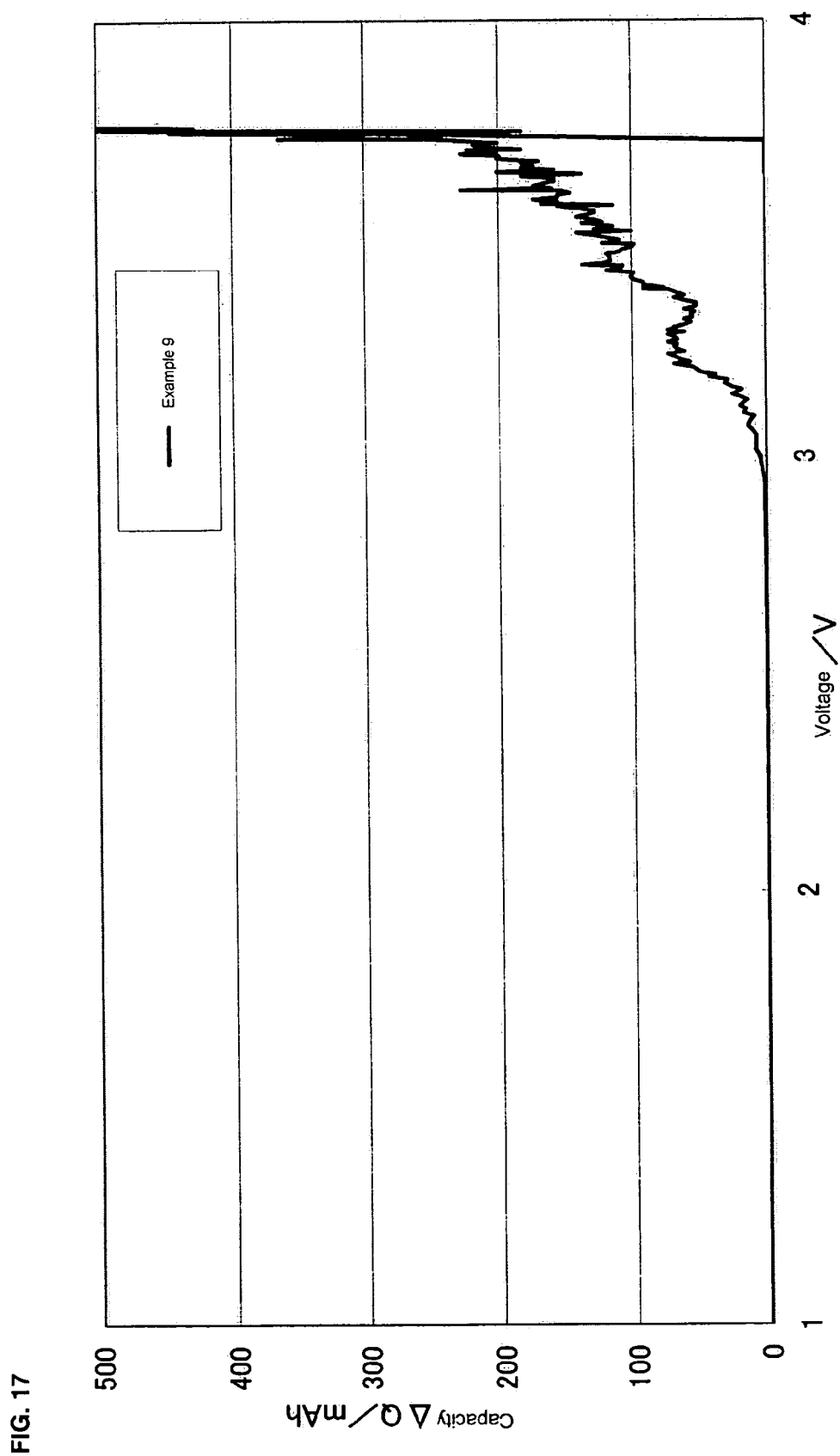
FIG. 17 is a profile showing columbic efficiency and charge voltage during initial charging of rechargeable lithium battery according to Example 9 of the present invention.
Figure 18:
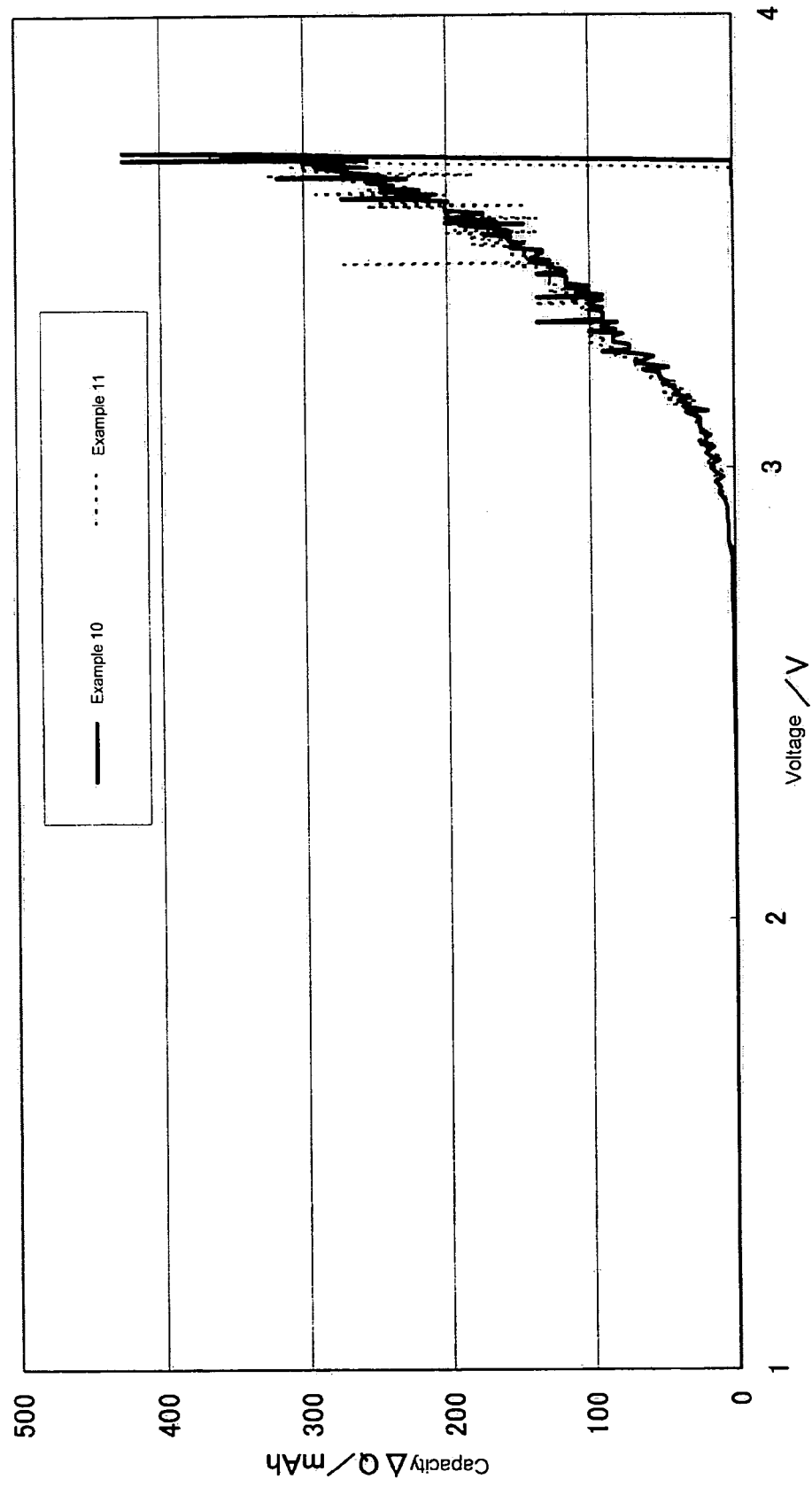
FIG. 18 is a profile showing columbic efficiency and charge voltage during initial charging of rechargeable lithium batteries according to Examples 10 and 11 of the present invention.

The profiles of the columbic efficiency and the charge voltage during the formation of the cells according to Examples 6 to 11 are presented in FIGS. 14 to 18. FIG. 14 shows the result of the cell according to Example 6, FIG. 15 shows the result of Example 7, FIG. 16 shows the result of Example 8, FIG. 17 shows the result of Example 9, and FIG. 18 shows the results of Examples 10 and 11.

It is shown in FIGS. 14 to 18 that the cells according to Examples 6 to 8 without the addition of FEC have peaks at approximately 3.3V. The peak is considered to occur because of a reaction in which $LiPF_6$ is intercalated into the surface of the negative electrode. In the cells according to Examples 10 and 11, the current at the peak of approximately 3.3V was reduced, and there cells generated a reduced amount of gas. These results are believed to occur because the added FEC facilitates the formation of the thin layer on the surface of the negative electrode.

The LiBeti in the cell according to Example 9 reduced the current at the peak of approximately 3.3V and facilitated the formation of the thin layer on the surface of the negative electrode.

In addition, the oil with $R_1$ to $R_7$ of $CH_3$, an m of 4, a k of 0, and an n of 2 showed the similar results to Experiment 4.

As described above, the non-aqueous electrolyte of the present invention with polyether-modified silicon oil exhibits good thermal stability and high lithium ionic conductivity. The non-aqueous electrolyte can provide a rechargeable lithium battery exhibiting high thermal stability, improved ionic conductivity, high-temperature safety, and good high rate charge and discharge.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A non-aqueous electrolyte comprising:
    a cyclic carbonate;
    a lithium salt; and
    a polyether-modified silicon oil represented by formula 1 in which a polyether chain is bonded to a terminal end of a linear polysiloxane chain, the polyether-modified silicon oil having a viscosity of less than 10cSt at 25° C.:

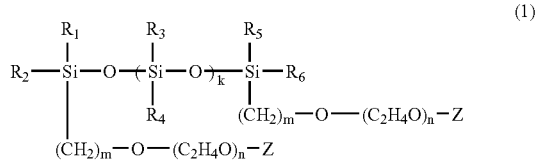

(1)

where k is an integer from 0 to 10;
m is a natural number from 2 to 4;
n is a natural number from 1 to 4;
$R_1$ to $R_7$ are independently or identically, selected from hydrogen or $C_1$ to $C_5$ alkyls; and Z is $CH_3$ or $C_2H_5$.

2. The electrolyte of claim 1, wherein the polyether-modified silicon oil has a flash point of 120° C. or more.

3. The electrolyte of claim 1 further comprising a chain carbonate.

4. The electrolyte of claim 1 further comprising a fluorinated cyclic carbonate.

5. A rechargeable lithium battery comprising:
    a positive electrode;
    a negative electrode; and
    a non-aqueous electrolyte comprising:
        a polyether-modified silicon oil represented by formula 1 in which a polyether chain is bonded to a terminal end of a linear polysiloxane chain, the polyether-modified silicon oil having a viscosity of less than 10cSt at 25° C.,
        a cyclic carbonates, and
        a lithium salt:

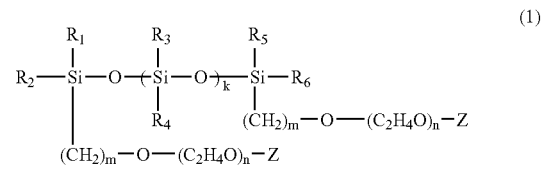

(1)

where k is an integer from 0 to 10;
m is a natural number from 2 to 4;
n is a natural number from 1 to 4;
$R_1$ to $R_7$ are independently or identically, selected from hydrogen or $C_1$ to $C_5$ alkyls; and Z is $CH_3$ or $C_2H_5$.

6. The rechargeable lithium battery of claim 5, wherein the negative electrode comprises a thin layer comprising a compound selected from the group consisting of polyacrylate compounds, aziridine compounds, fluorinated cyclic carbonates and mixtures thereof.

7. The rechargeable lithium battery of claim 5, wherein the non-aqueous electrolyte further comprises a chain carbonate.

8. The rechargeable lithium battery claim 5, wherein the non-aqueous electrolyte further comprises a fluorinated cyclic carbonate.

9. An electrolyte for a rechargeable lithium battery comprising:
    a polyether-modified silicon oil having a viscosity of less than 10 cSt at 25° C., a cyclic carbonate, and a lithium salt, wherein the polyether-modified silicon oil includes end silicons, wherein each end Si atom includes a terminal bond to a polyether group.

10. The electrolyte of claim 9, wherein the polyether-modified silicon oil has a flash point of 120° C. or more.

11. The electrolyte of claim 9 further comprising a chain carbonate.

12. The electrolyte of claim 9 further comprising a fluorinated cyclic carbonate.

13. A rechargeable lithium battery comprising:
    a positive electrode;
    a negative electrode; and
    an electrolyte comprising a polyether-modified silicon oil having a viscosity of less than includes end silicons with terminal bonds consisting of Si-C or Si-H bonds and wherein each end Si atom includes a terminal bond to a polyether group.

14. The rechargeable lithium battery of claim 13, wherein the negative electrode comprises a thin layer comprising a compound selected from the group consisting of polyacrylate compounds, aziridine compounds, and fluorinated cyclic carbonates, or a combination thereof on a surface thereof.

15. The rechargeable lithium battery of claim 13, wherein the electrolyte further comprises a chain carbonate.

16. The rechargeable lithium battery claim 13, wherein the electrolyte further comprises a fluorinated cyclic carbonate.

* * * * *

UNITED STATES PATENT AND TRADEMARK OFFICE
CERTIFICATE OF CORRECTION

PATENT NO. : 7,351,501 B2
APPLICATION NO. : 10/754453
DATED : April 1, 2008
INVENTOR(S) : Cheol-Soo Jung It is certified that error appears in the above-identified patent and that said Letters Patent is hereby corrected as shown below:

In the Claims

| | |
|---|---|
| Column 20, line 1, Claim 5 | Delete "carbonates", Insert --carbonate-- |
| Column 20, line 58, Claim 16 | After "battery", Insert --of-- |

Signed and Sealed this

Fourth Day of November, 2008

JON W. DUDAS
*Director of the United States Patent and Trademark Office*

UNITED STATES PATENT AND TRADEMARK OFFICE
CERTIFICATE OF CORRECTION

PATENT NO.       : 7,351,501 B2                                           Page 1 of 1
APPLICATION NO.  : 10/754453
DATED            : April 1, 2008
INVENTOR(S)      : Cheol-Soo Jung It is certified that error appears in the above-identified patent and that said Letters Patent is hereby corrected as shown below:

Column 20, line 46, Claim 13    After "than",
                                Insert --10cSt at 25°C, a cyclic carbonate, and a lithium salt
                                wherein the polyether-modified silicon oil--

Signed and Sealed this

Fourth Day of May, 2010

David J. Kappos
*Director of the United States Patent and Trademark Office*